United States Patent [19]
McDoulett, Jr. et al.

[11] Patent Number: 5,364,444
[45] Date of Patent: Nov. 15, 1994

[54] METAL LEACHING AND RECOVERY PROCESS

[75] Inventors: C. Dale McDoulett, Jr., Tulsa, Okla.; George W. Reschke, Oakville, Canada

[73] Assignee: North American Pallidium Ltd., Toronto, Canada

[21] Appl. No.: 89,088

[22] Filed: Jul. 8, 1993

[51] Int. Cl.$^5$ ............................................. C22B 3/46
[52] U.S. Cl. ........................................ 75/421; 75/422; 204/107; 423/22; 423/140
[58] Field of Search ................. 75/421, 422, 423; 204/107; 423/22, 140

[56] References Cited

U.S. PATENT DOCUMENTS 2,829,967  4/1958  Schlecht ............................... 75/421

Primary Examiner—Melvyn J. Andrews
Attorney, Agent, or Firm—Dougherty, Hessin, Beavers & Gilbert

[57] ABSTRACT

A process for extracting metals from a flotation concentrate containing gold, platinum group minerals, copper, nickel and sulfur. The process involves roasting the concentrate in the presence of oxygen to reduce the sulfur content of the concentrate to approximately two percent; leaching the roasted concentrate with an acid solution containing hydrochloric and nitric acids to dissolve substantially all of the metals; and recovering the metals from the solution.

14 Claims, 1 Drawing Sheet

METAL LEACHING AND RECOVERY PROCESS

FIELD OF THE INVENTION

This invention relates to metal recovery processes, and more particularly, to processes to recover metals from a flotation concentrate containing platinum group minerals and sulfur.

BACKGROUND OF THE INVENTION

Previous methods for recovering precious metals from a flotation concentrate involve smelting the concentrate to produce a "matte" in which metals values are further concentrated. The matte is then subjected to series of leaching steps to leach out the base metals. Generally, a separate leaching step is used for each base metal to be removed. The precious metals are then leached out and removed from each of the leaching solutions in subsequent recovery steps.

The traditional process described above has several shortcomings. Firstly, smelting is generally an environmentally undesirable process because of the gasses given off and the problem of disposal of solid residue. Furthermore, if the concentrate has a high magnesia content, the melting temperature of the concentrate may be too high to be effectively smelted. Still furthermore, using a plurality of leaching steps is relatively costly and some of these steps also contribute to further environmental contaminates.

SUMMARY OF THE INVENTION

In a process for the recovery of platinum group metals from an ore concentrate containing at least platinum group metals and sulfur, an improvement comprising the step of:

1) roasting said concentrate in an oxygen-containing environment at a temperature sufficient to oxidize a portion of said sulfur to form a roasted concentrate, said roasting being carried out until the amount of sulfur in said concentrate is reduced to an amount sufficient to cause enhanced leaching of said platinum group metals when said roasted concentrate is mixed with hydrochloric acid to which an amount of nitric acid has been added sufficient to enhance dissolution of metals from said roasted concentrate, said solution being heated to a temperature sufficient to allow a substantial portion of said metals to dissolve in said hydrochloric and nitric acid solution with said solution being in an environment containing oxygen at a pressure sufficient to regenerate at least a portion of said nitric acid.

DESCRIPTION OF PREFERRED EMBODIMENTS

Figure 1:
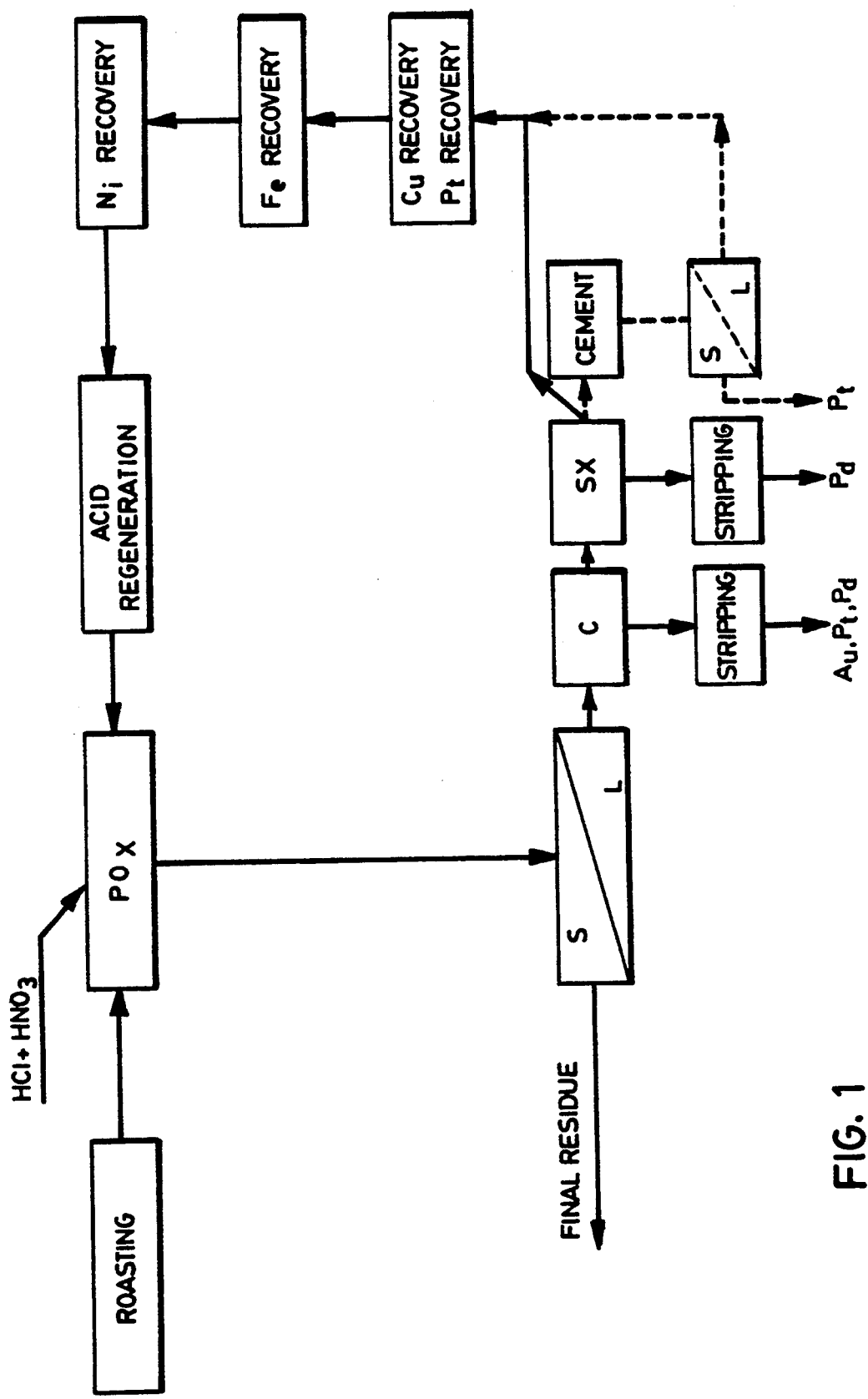
FIG. 1 is a schematic diagram of a process according to the present invention.

The process of the present invention was developed to recover gold, platinum, palladium, copper and nickel from bulk sulfide concentrates obtained from Lac Des Iles flotation mill through the use of acid leaching procedures. A typical range of analysis for the valuable metals and impurities contained in the concentrates are set out in Table 1 below.

TABLE 1

| Element | g/t; % | Element | % | Element | % |
| --- | --- | --- | --- | --- | --- |
| Gold | 4–6 g/t | Barium | 0.002 | Sodium | 0.20 |
| Platinum | 4–6 g/t | Beryllium | <0.001 | Neodymium | <0.005 |
| Palladium | 50–80 g/t | Calcium | 0.31 | Phosphorus | <0.002 |
| Copper | 2.5–3.0 | Cadmium | 0.001 | Lead | <0.082 |
| Nickel | 1.8–2.5 | Cobalt | 0.13 | Tin | <0.002 |
| Iron | 12.0–12.5 | Chromium | 0.020 | Tellurium | <0.003 |
| Sulphur | 6–8 | Arsenic | 0.008 | Antimony | <0.001 |
| Aluminum | 1–3 | Lanthanum | <0.001 | Selenium | 0.008 |
| Magnesium | 3–6 | Manganese | 0.044 | Yttrium | <0.001 |
| Silica | 30–40 | Molybdenum | <0.01 | Zinc | 0.26 |

The main metal values contained in the concentrates are the Platinum Group Metals (PGM), gold (Au), copper (Cu), and nickel (Ni). The PGM are constituted by more or less complex sulphides, tellurides, arsenides, and alloys; Au appears native and as a telluride. The main sulphide constituents are chalchopyrite and pentlandite, but there are also minor amounts of pyrite and pyrrhotite.

Present commercial procedures used in the leaching of PGM and Au consist generally of an intermediate smelting stage, prior to leaching, to obtain a "matte" in which the metal values are further concentrated.

The first step of the process of the present invention is to roast the concentrate by heating the concentrate in an oxygen-containing environment such as air to oxidize a portion of the sulfur. It has been found that the roasting is best carried out at between 900° and 1200° F. The oxidation of sulfur during the roasting stage can be enhanced by agitating the concentrate ("rabbling") to better expose the sulfur in the concentrate to the oxidizing atmosphere. The roasting should be carried out until the sulfur content is reduced to about two percent.

It has been found that if roasting is carried out at too high or too low a temperature, the leachability of PGM in subsequent steps of the process is adversely affected. Although exact maximum and minimum temperatures have not been determined, effective results may be obtained by roasting in air within the temperature range set out above.

After the concentrate has been roasted, it is leached with an acid solution which is a blend of hydrochloric and nitric acids. The leaching is carried out in a glass-lined autoclave, heated to a moderate temperature and pressurized with a moderate pressure of oxygen gas.

When the initial development work was commenced for treatment of the above concentrates, the initial test work was directed at directly leaching the metals values from the concentrate. Direct leaching of the metal values provided Au recovery of 94–98%; Pt 29–38%; Pd, 90–93%; Cu, 98–99%; Ni, 93–96%. Leaching of the roasted concentrate gave an Au recovery of 95–98%; Pt, 94–95%; Pd, 87–91%; Cu, 78–96%; Ni, 82–92%. Surprisingly, and quite unexpectedly, the roasting process resulted in an almost three-fold increase in Pt recovery. As Pt is a very valuable metal, such an increase is very significant as it favourably impacts on the economics of the process.

It has been found that the rate of dissolution of metal sulphides in a slurry is greatly enhanced if the slurry carries oxygen in the solution. One way of providing the oxygen is to add small amounts of nitric acid in a closed vessel. Providing oxygen gas at a moderate pressure of around 50 p.s.i.g. enables the nitric acid to be continuously regenerated by the oxygen gas being applied.

Satisfactory results have been achieved with a hydrochloric acid to nitric acid ratio of around 50:1. It is expected that leaching may be carried out with a hydrochloric to nitric acid ration of from 100:1 to 3:1.

Moderately heating the acid and roasted concentrate mixture assists the leaching process. Effective results have been achieved at a temperature of around 190° F. The temperature should be kept below the melting temperature of sulfur as it has been found that poor recovery of precious metals in the solution occurred at reaction temperatures of 135° C. or higher (288.5° F).

Satisfactory results have been obtained using oxygen at approximately 50 p.s.i.g. It may be possible to substitute oxygen for air in the autoclave, if the autoclave is designed with enough free space to contain the necessary amount of air and to withstand the higher pressure requirements.

Once the leaching operation is substantially completed, the solution of acid and metal sulphides is separated from any undissolved portion of the roasted concentrate. The above leaching process is capable of forming, solutions of gold, palladium, platinum, copper and nickel.

The final step of the process is to retrieve the dissolved metals from the solution. Gold may be collected on activated carbon in an acidic solution. Similarly, the palladium and platinum may also be collected on activated carbon.

Palladium may be removed from the solution by solvent extraction, for example by mixing with dioctyl or dihexyl sulfide. At this stage, the solution may contain copper, platinum, nickel and iron. Platinum may be removed by cementation with a copper powder or the solution may be electrolyzed in an electrolytic cell to collect both the copper and platinum on the cathode.

The remaining nickel and iron solution may be treated by precipitating the nickel and iron together as a hydroxide which may then be sold to a smelter. Alternatively, a portion of the iron may be oxidized in an autoclave to form a ferric oxide precipitate which may be separated. The balance of the dissolved iron may be precipitated outside of the autoclave as a ferric hydroxide.

If the iron is removed separately from the nickel, the solution will still contain nickel. Nickel may be removed as a hydroxide, as a carbonate or through electrolysis as nickel plate. If calcium is used as a precipitating agent, this will leave a spent solution of calcium chloride.

It is desirable to regenerate the hydrochloric acid used in the process. This may be accomplished by reacting the calcium chloride solution with sulphuric acid to give hydrochloric acid and calcium sulfate as products. The calcium sulfate may be separated as a solid from the hydrochloric acid and sold as such, for example, for use in the building industry as gypsum. The hydrochloric acid may then be reused in the process.

Various aspects of the present invention may be more fully described by reference to the examples set out below. The examples refer to various test numbers. Table 2 sets out the head analysis of concentrate samples used in the tests.

TABLE 2

| | Head Analysis of Concentrate Samples Used in the Test Programme | | | | | | | |
|---|---|---|---|---|---|---|---|---|
| | Test | g/t | | | % | | | |
| SAMPLE | No. | Au | Pt | Pd | Cu | Ni | Fe | St |
| High Grade | 1A - 10 | 19.10 | 14.9 | 181 | 7.69 | 5.91 | 20.6 | 21.6 |
| Comp. #1 | 11–17 | 6.67 | 4.59 | 85 | 2.54 | 1.80 | 12.5 | 8.75 |
| Comp. #2 | 18–19 | 5.61 | 6.48 | 59.2 | 2.80 | 2.13 | 12.5 | 7.83 |
| Comp. #2 | 20–22 | 4.93 | 5.62 | 56.7 | 2.66 | 2.02 | 12.0 | N.A. |
| Comp. #4 | 23–24 | 6.38 | 5.89 | 82.15 | 3.41 | 1.95 | 12.3 | 7.66 |
| Comp. #5 | 25 | 8.45 | 7.40 | 99.40 | 4.11 | 3.71 | 14.5 | 11.2 |
| Comp. #6 | 26 | 17.40 | 12.40 | 146.0 | 5.76 | 3.74 | 18.7 | 16.40 |
| Comp. #7 | 27 | 8.16 | 7.20 | 94.30 | 4.06 | 2.54 | 14.1 | N.A. |

EXAMPLE 1

Reference leaching tests were carried out to ascertain the extent to which metals in the concentrate could be dissolved. For this purpose, three tests were carried out using "aqua regia".

In tests numbers 2A and 1A, a concentrate sample was pulped in a reaction kettle with dilute or concentrated aqua regia, according to the test. The pulp was agitated with a mixer, and the kettle placed on a hot plate. Temperature was monitored with a thermometer immersed in the pulp. On completion of the reaction time, the slurry was filtered. The residue cake was re-pulped in a five percent HCl solution and re-filtered.

In test number 3A, the sample was placed in a two-liter PARR autoclave and pulped with concentrated aqua regia. Temperature and oxygen pressure were monitored throughout the test. At the end of the reaction time, the vessel was quenched and the pulp filtered. The conditions are shown in Table 3 and the results in Table 4.

TABLE 3

| | Aqua Regia Leaching | | |
|---|---|---|---|
| Conditions | Test 2A | Test 1A | Test 3A |
| Aqua Regia, % Sol'n | 43.5 | 100 | 100 |
| Temp; °C.(max) | 95 | 95 | 115 |
| Reaction Time, hrs | 2 | 1.5 | 1.0 |
| Pressure, psig | Atm. | Atm. | 100 O$_2$ |
| Final pH of Liquor, (approx) | 0 | 0 | 0 |

TABLE 4

| | | | Aqua Regia Leaching Results | | | | | | | | | | | | |
|---|---|---|---|---|---|---|---|---|---|---|---|---|---|---|---|
| | | | Assay (mg/l; %; g/t) | | | | | | | | % Distribution | | | | |
| Test No. | Product | Amount g, ml | Au | Pt | Pd | Cu | Ni | Fe | Mg | St | S= | Au | Pt | Pd | Cu | Ni |
| 2A | Filtrate | 2650 | 3.34 | 0.47 | 23.2 | 6910 | 5460 | 25000 | 740 | 17000 | — | 79.7 | 16.3 | 67.8 | 68.0 | 67.8 |
| 1 | Wash | 1420 | — | — | — | 461 | 371 | | | | | 20.3 | 83.7 | 32.2 | 32.0 | 32.2 |
| hour | Residue | 142.9 | 7.31 | 20.8 | 95.0 | 4.95 | 3.98 | | | | | | | | | |
| | Head | 235.0 | 21.9 | 15.1 | 179 | 9.4 | 7.52 | | | | | 100.0 | 100.0 | 100.0 | 100.0 | 100.0 |

TABLE 4-continued

Aqua Regia Leaching Results

| Test No. | Product | Amount g, ml | Assay (mg/l; %; g/t) | | | | | | | | | % Distribution | | | | |
|---|---|---|---|---|---|---|---|---|---|---|---|---|---|---|---|---|
| | | | Au | Pt | Pd | Cu | Ni | Fe | Mg | St | S= | Au | Pt | Pd | Cu | Ni |
| | (Calc'd) Head | | | | | | | | | | | | | | | |
| | (Direct) Head | 235.0 | 19.1 | 14.9 | 181 | 7.69 | 5.91 | | | | | | | | | |
| 2A | Filtrate | 2610 | 2.77 | 0.43 | 22.9 | 8270 | 6410 | 26000 | 820 | 15000 | — | | | | | |
| 2 | Wash | 1420 | — | | | 461 | 371. | | | | | 76.7 | 15.1 | 67.5 | 60.4 | 59.6 |
| hour | Residue | 142.9 | 7.31 | 20.8 | 950 | 4.95 | 3.98 | | | | | 23.3 | 84.9 | 32.5 | 39.6 | 40.4 |
| | Head (Calc'd) | 235.0 | | | | | | | | | | 100.0 | 100.0 | 100.0 | 100.0 | 100.0 |
| | Head (Direct) | | 19.1 | 14.9 | 292 | 7.69 | 5.91 | | | | | | | | | |
| 1A | Filtrate | 1205 | 2.99 | 0.49 | 24.7 | 11000 | 7420 | | | | | 99.1 | 22.2 | 87.1 | 97.4 | 89.9 |
| | Wash | 905 | 0.10 | 0.03 | 0.79 | 329 | 251 | | | | | 0.9 | 77.8 | 12.9 | 2.6 | 10.1 |
| | Residue | 86.6 | 0.36 | 25.0 | 52.1 | 0.41 | 1.19 | | | | | 100.0 | 100.0 | 100.0 | 100.0 | 100.0 |
| | Head (Calc'd) | 190.0 | 19.6 | 14.6 | 184 | 7.32 | 5.37 | | | | | | | | | |
| | Head (Direct) | | 19.1 | 14.9 | 292 | 7.69 | 5.91 | | | | | | | | | |
| 3A | Filtrate | 1160 | | 1.00 | 28.2 | 11080 | 8500 | | | | | 95.6 | 50.6 | 94.0 | 92.0 | 90.4 |
| | Wash | 1000 | | <0.02 | 0.41 | 168 | 134 | | | | | | | | | |
| | Residue (+¼") | 3.3 | | | | | | | | | | | | | | |
| | Residue (+20 mesh) | 6.5 | | | | | | | | | | | | | | |
| | Residue (++65 mesh) | 0.6 | | | | | | | | | | | | | | |
| | Residue (−65 mesh) | 62.3 | 2.46 | 18.5 | 34.3 | | 0.09 | | | 0.10 | 0.04 | 4.4 | 49.4 | 6.0 | 8.0 | 0.6 |
| | Head (Calc'd) | 182.0 | | | | | | | | | | 100.0 | 100.0 | 100.0 | 100.0 | 100.0 |
| | Head (Direct) | | 19.1 | 14.9 | 181 | 7.69 | 5.91 | — | — | — | — | | | | | |

The atmospheric test numbers 2A and 1A, show that better dissolution of the metals was obtained with concentrated rather than diluted aqua regia. It is interesting to note that longer reaction times of up to two hours, as in test number 2A did not benefit the dissolution of any of the metals. Both tests were however subject to problems due to the violence of the reaction, the foaming of the concentrate and the increase in volume due to the gases formed during the reaction.

The extreme conditions used in test number 3A resulted in better dissolution for the metals. The melting of some of the sulfur, however, could very well account for the precipitation of Au and PGM, especially of Pt, of which higher dissolution rates were expected.

EXAMPLE 2

Two tests, numbers 4 and 5, were carried out in order to determine the extent of Cu and Ni dissolution.

Concentrate samples weighing 3 kg were pulped in water and placed in and 18.5 liter glass-lined autoclave, to which HCl was added and the pulp agitated. Temperature and oxygen pressure were monitored throughout the test. After a pre-determined reaction time, the vessel was drained and the pulp filtered. The solid cake residue was then washed through the filter with 2.5 liters of 10 g/l HCl and 3 liters of water. The conditions are shown in Table 5 and the results in table 6.

TABLE 5

| HCl Pressure Leaching | | |
|---|---|---|
| Conditions | Test 4 | Test 5 |
| HCl, % Sol'n (vol) | 36.5 | 36.5 |
| Temperature °C. | 95 | 95 |
| Reaction Time, hours | 1 | 1 |
| Pressure, psig O₂ | 50 | 50 |
| Final EMF, mV | 380 | 505 |
| Fianl pH of Liquor (approx) | 0 | 0 |

TABLE 6

| Test No | Product | Amount g, ml | Assay (mg/l, %, g/t) | | | | | | | | % Distribution | | | | | |
|---|---|---|---|---|---|---|---|---|---|---|---|---|---|---|---|---|
| | | | Au | Pt | Pd | Cu | Ni | Fe | St/S= | S(o) | Au | Pt | Pd | Cu | Ni | Fe |
| 4 | Filtrate | 7400 | 0.02 | 0.02 | 0.04 | 16000 | 18400 | 34300 | 3780 | — | | | | | | |
| | Wash | 5460 | 0.05 | 0.02 | 0.10 | 1700 | 2100 | 4030 | — | — | 0.6 | 0.5 | 0.1 | 47.3 | 71.7 | 34.4 |
| | Residue #1 | 2519.7 | 26.3 | 17.8 | 250 | 4.91 | 1.75 | 18.20 | 18.5 | 8.90 | | | | | | |
| | | | | | | | | | | | 99.4 | 99.5 | 99.9 | 52.7 | 28.3 | 65.6 |
| | Residue #2 | 302.8 | 24.7 | 15.4 | 206 | 6.01 | 4.72 | 21.80 | 21.7 | 1.36 | | | | | | |
| | Head (Calc'd) | 3000.0 | 24.7 | 16.6 | 231 | 8.99 | 6.87 | 26.68 | — | — | 100.0 | 100.0 | 100.0 | 100.0 | 100.0 | 100.0 |
| | Head (Direct) | | 19.1 | 14.9 | 181, | 7.09 | 5.91 | | | | | | | | | |
| 5 | Filtrate | 6500 | 1.47 | 0.07 | 26 | 21300 | 17700 | 37800 | 5960 | — | 17.4 | 1.3 | 30.0 | 76.1 | 80.8 | 44.2 |
| | Wash | 3500 | 0.07 | 0.02 | 0.17 | 2900 | 2360 | 5060 | 1010 | — | | | | | | |
| | Residue | 2017.7 | 23.1 | 20.8 | 196 | 2.32 | 1.46 | 16.50 | 16.9 | 13.8 | 82.6 | 96.7 | 70.0 | 23.0 | 19.3 | 55.8 |
| | Head (Calc'd) | 3000.0 | 18.8 | 14.2 | 188 | 6.51 | 5.09 | 19.88 | — | — | 100.0 | 100.0 | 100.0 | 100.0 | 100.0 | 100.0 |
| | Head | | 19.1 | 14.9 | 181 | 7.09 | 5.91 | — | — | — | | | | | | |

TABLE 6-continued

| Test No | Product | Amount g, ml | Assay (mg/l, %, g/t) | | | | | | | % Distribution | | | | | |
|---|---|---|---|---|---|---|---|---|---|---|---|---|---|---|---|
| | | | Au | Pt | Pd | Cu | Ni | Fe | St/S= | S(o) | Au | Pt | Pd | Cu | Ni | Fe |
| | (Direct) | | | | | | | | | | | | | | | |

Reaction time of one hour left most of the Au and PGM in the residue, but did not put enough Cu, Ni, and Fe into solution.

Reaction time of seven hours improved the dissolution of Cu and Ni, but still left more than half of the Fe undissolved. Furthermore, more Au and Pd went into solution. The latter result probably arose as the final oxidation potential of the solution (505 mV) was above that at which only sulfides are expected to dissolve.

EXAMPLE 3

The rate of dissolution of metal sulfides in a slurry is greatly enhanced if it carries oxygen in solution. One way of providing oxygen is to add small amounts of $HNO_3$, this method has the advantage of $HNO_3$ being continuously regenerated by the oxygen gas supplied to the vessel.

Tests numbers 6 and 9 were conducted in order to find the ratio of HCl to $HNO_3$ from which the maximum dissolution of metals could be obtained. Test number 10 was designed to substitute $HNO_3$ for $KNO_3$.

Concentrate samples weighing 2 kg each for a total of 4 kg, were ground in a laboratory ball mill for 35 minutes at 60% solids to give a grind of approximately 95%-200 mesh. The samples were filtered and then repulped in water and placed in an 18.5 liter glass-lined autoclave, to which concentrated HCl (stoichiometrically calculated for the content of Cu, Ni, Fe and Mg), and different amounts of concentrated $HNO_3$ were added and pulp agitated. The vessel was sealed and steam was applied to the heating jacket. Once at the desired temperature, oxygen was added and maintained at a specified pressure. Samples were taken periodically, and upon completion of the test, the pulp was removed, filtered and the solid cake residue washed and dried.

The conditions for the tests are shown in Table 7 and the results in Table 8.

TABLE 7

| Conditions | Test No 6 | Test No 7 | Test No 8 | Test No 9 | Test No 10 |
|---|---|---|---|---|---|
| HCl (36–38%) (t/t conc.) | 1.575 | 1.575 | 1.575 | 1.575 | 1.575 |
| $HNO_3$ (69%) (t/t conc.) | 0.178 | 0.018 | 0.036 | 0.024 | |
| $HCl/HNO_3$ ratio (by Volume) | 10:1 | 100:1 | 50:1 | 75:1 | |
| $KNO_3$ (t/t conc.) | | | | | 0.038 |
| $HCl/KNO_3$ ratio(by Volume) | | | | | 75:1 |
| Pulp Density (% solids) | 27.3 | 27.3 | 27.3 | 27.3 | 28.4 |
| Maximum Temp. (°C.) | | 105 | 120 | 120 | 120 |
| $O_2$ Pressure (psig) | 50 | 50 | 50 | 50 | 50 |
| Steam Pressure (at temp) (psig) | 15 | 15 | 15 | 15 | 15 |
| Total Pressure (psig) | | 60–80 | 60–80 | 60–80 | 60–80 |
| Reaction Time (at temp) (h) | | 2 | 2 | 2 | 2 |
| Final EMF of Preg. Sol'n (mV) | | 794 | 820 | 605 | 771 |

TABLE 8

| Test No | Products | Amount g, ml | Assays (mg/l, %, g/t) | | | | | | | % Distribution | | | | | |
|---|---|---|---|---|---|---|---|---|---|---|---|---|---|---|---|
| | | | Au | Pt | Pd | Cu | Ni | Fe | St/S= | Au | Pt | Pd | Cu | Ni | Fe |
| 6 | Liquor | | 4.13 | 0.13 | 37.3 | 16900 | 5090 | 26500 | 11900 | | | | | | |
| 7 | Liquor | 9200 | 6.44 | 0.39 | 50.4 | 23700 | 14700 | 45500 | 9420 | | | | | | |
| | Wash | 2220 | 2.09 | 0.11 | 15.0 | 7710 | 4720 | 14800 | 3640 | 94.2 | 24.5 | 91.6 | 95.8 | 98.5 | 75.9 |
| | Residue | 1430 | 2.87 | 8.6 | 33.4 | 0.26 | 0.46 | 10.6 | — | 5.8 | 75.5 | 8.4 | 1.5 | 4.2 | 24.1 |
| | Head (Calc'd) | 4000 | 17.5 | 4.1 | 141 | 6.31 | 4.01 | 15.73 | — | 100.0 | 100.0 | 100.0 | 100.0 | 100.0 | 100.0 |
| | Head (Direct) | 4000 | 19.1 | 14.9 | 181 | 7.69 | 5.91 | — | — | | | | | | |
| 8 | Liquor | 9330 | 7.33 | 0.97 | 50.6 | 24100 | 11800 | 58200 | 22900 | | | | | | |
| | Wash | 2860 | 1.59 | 0.22 | 11.0 | 5670 | 2720 | 13600 | 6890 | 96.7 | 38.1 | 93.3 | 97.3 | 97.4 | 90.4 |
| | Residue | 1150.8 | 0.86 | 13.8 | 31.9 | 0.60 | 0.28 | 5.5 | — | 1.3 | 61.9 | 6.7 | 2.7 | 2.6 | 9.6 |
| | Head (Calc'd) | 4000 | 18.6 | 6.4 | 137 | 6.38 | 3.13 | 16.53 | — | 100.0 | 100.0 | 100.0 | 100.0 | 100.0 | 100.0 |
| | Head (Direct) | | 19.1 | 14.9 | 181 | 7.69 | 5.91 | — | — | | | | | | |
| 9 | Liquor | 9000 | 4.47 | 0.58 | 40.4 | 20800 | 10700 | 50700 | 18500 | | | | | | |
| | Wash | 2500 | 1.46 | 0.19 | 12.4 | 6790 | 3370 | 16000 | 7070 | 79.3 | 11.9 | 68.4 | 90.2 | 69.1 | 74.3 |
| | Sulphur Product | 346.8 | 10.70 | 24.5 | 162.0 | 2.67 | 5.99 | 15.0 | — | 6.7 | 17.8 | 9.6 | 3.9 | 13.2 | 7.6 |
| | Residue | 1640.4 | 4.77 | 20.5 | 77.9 | 0.85 | 1.70 | 7.6 | — | 14.0 | 70.3 | 22.0 | 5.9 | 17.7 | 18.1 |
| | Head (Calc'd) | 4000.0 | 13.9 | 12.0 | 146 | 5.87 | 3.94 | 17.21 | — | 100.0 | 100.0 | 100.0 | 100.0 | 100.0 | 100.0 |
| | Head (Direct) | | 19.1 | 14.9 | 181 | 7.69 | 5.91 | — | — | | | | | | |
| 10 | Liquor | 9900 | 6.47 | 0.83 | 46.9 | 22100 | 12100 | 54100 | 20700 | | | | | | |
| | Wash | 3800 | 2.01 | 0.25 | 13.9 | 6760 | 3580 | 16700 | 7480 | 98.5 | 37.4 | 92.2 | 99.2 | 96.3 | 90.7 |
| | Sulphur | 111.1 | 2.21 | 11.4 | 93.3 | 1.47 | 2.87 | 4.7 | — | 0.4 | 5.0 | 1.9 | 0.6 | 2.2 | 0.8 |

TABLE 8-continued

| Test No | Products | Amount g, ml | Assays (mg/l, %, g/t) | | | | | | | % Distribution | | | | | |
|---|---|---|---|---|---|---|---|---|---|---|---|---|---|---|---|
| | | | Au | Pt | Pd | Cu | Ni | Fe | St/S= | Au | Pt | Pd | Cu | Ni | Fe |
| | Product Residue | 1224.3 | 0.64 | 11.9 | 27.8 | 0.05 | 0.18 | 4.8 | — | 1.1 | 57.6 | 5.9 | 0.3 | 1.5 | 8.5 |
| | Head (Calc'd) | 4000.0 | 18.5 | 6.3 | 144 | 6.35 | 3.59 | 17.09 | | | | | | | |
| | Head (Direct) | | 19.1 | 14.9 | 181 | 7.69 | 5.91 | — | — | 100.0 | 100.0 | 100.0 | 100.0 | 100.0 | 100.0 |

The use of nitric acid a pseudo-catalytic agent was shown effective in the oxidation process.

In test number 6 where the ratio of HCl to $HNO_3$ was 10:1 by volume, the reaction was very violent and resulted in high temperature and pressure. The test had to be terminated due to blow-out of the slurry at a pressure of 250 p.s.i.g. Under these conditions, leaching was proceeding at an accelerated rate and total leaching time was less than 10 minutes. Leach conditions were moderated in subsequent tests by increasing the ratio of HCl to $HNO_3$.

In test number 7, the heat of reaction was less evident. Heat had to be applied to the vessel for the duration of the test. Very good dissolution was obtained for Au, Pd, Cu, and Ni. Dissolution of Pt was relatively low at 24.5%. By increasing the amount of $HNO_3$, in test number 8, excellent dissolution of Au, Pd, Cu and Ni was obtained, and Pt dissolution was increased to 38.1%.

Test number 9, which was designed as an intermediate test between number 7 and number 8, ran into problems due to the plug-up of the vessel drain valve with molten sulfur. This resulted in the cut-off of the oxygen supply.

of the test, the pulp was removed, filtered, and the solid cake residue washed and dried.

Conditions and results of these tests are shown respectively in Tables 9 and 10.

TABLE 9

| Conditions | Test No 11 | Test No 12 |
|---|---|---|
| HCl, (36–38%) (t/t conc.) | 1.512 | 0.709 |
| $HNO_3$ (69%) (t/t conc.) | 0.034 | 0.016 |
| HCl/$HNO_3$ ratio by Volume | 50:1 | 50:1 |
| Pulp Density (% Solids) | 28 | 26.4 |
| Temp., (°C.) | 118 | 118 |
| $O_2$ Pressure (psig) | 50 | 50 |
| Steam Pressure (at temp) (psig) | 15 | 15 |
| Total Pressure (psig) | 65→80 | 65→80 |
| Reaction Time (at temp) (h) | 2 | 2 |
| Final EMF of Preg. Sol'n (mV) | 830 | 694 |

TABLE 10

Oxidant Boosted Pressure Leaching of Low Grade Concentrate

| Test No | Products | Amount g, ml | Assay (mg/l, %, g/t) | | | | | | | % Distribution | | | | | |
|---|---|---|---|---|---|---|---|---|---|---|---|---|---|---|---|
| | | | Au | Pt | Pd | Cu | Ni | Fe | St/S= | Au | Pt | Pd | Cu | Ni | Fe |
| 11 | Liquor | 9300 | 2.05 | 0.37 | 21.1 | 7610 | 2900 | 23400 | 7570 | 98.9 | 37.2 | 90.6 | 99.7 | 93.0 | 71.5 |
| | Wash | 5160 | 0.99 | 0.12 | 6.47 | 2260 | 904 | 7150 | 3650 | | | | | | |
| | Residue | 2027.0 | 0.13 | 3.43 | 12.0 | 0.01 | 0.12 | 5.1 | 0.08 | 1.1 | 62.8 | 9.4 | 0.3 | 7.0 | 28.5 |
| | Head (Calc'd) | 4000 | 6.19 | 2.77 | 64.4 | 2.10 | 0.87 | 9.06 | — | 100.0 | 100.0 | 100.0 | 100.0 | 100.0 | 100.0 |
| | Head (Direct) | | 6.67 | 4.59 | 85 | 2.54 | 1.80 | 12.50 | — | | | | | | |
| | Liquor | 9950 | 1.65 | 0.28 | 17.0 | 6750 | 4300 | 28400 | 9110 | 92.4 | 18.2 | 73.5 | 92.4 | 83.7 | 72.2 |
| | Wash | 4650 | 0.58 | 0.08 | 5.66 | 2330 | 1170 | 7880 | 3415 | | | | | | |
| | Residue | 2188.3 | 0.74 | 6.65 | 33.0 | 0.30 | 0.44 | 5.75 | 7.16/0.96 | 7.6 | 81.8 | 26.5 | 7.6 | 16.3 | 27.8 |
| | Head (Cacl'd) | 4000.0 | 5.30 | 4.45 | 68.2 | 2.17 | 1.47 | 11.31 | | 100.0 | 100.0 | 100.0 | 100.0 | 100.0 | 100.0 |
| | Head (Direct) | | 6.67 | 4.59 | 85 | 2.54 | 1.80 | 12.50 | | | | | | | |

Test number 10 shows $KNO_3$ as a good substitute of $HNO_3$.

EXAMPLE 4

Concentrate samples weighing 2 kg each for a total for 4 kg, were ground in a laboratory ball mill for 35 minutes at 60% solids to give a grind of approximately 95%–200 m. The samples were filtered, then re-pulped in water and placed in an 18.5 liter glass-lined autoclave. Agitation was then started. Concentrated HCl (stoichiometrically calculated for the content of Cu, Ni, Fe and Mg in one test and deducting free acid in the following test) was added followed by $HNO_3$ addition. The vessel was then sealed and steam was applied to the heating jacket. Once at the desired temperature, Oxygen was added and maintained at specified pressure. Samples were taken periodically and upon completion The degree of dissolution of metals from a lower grade concentrate is very similar to that obtained with the high grade concentrate, as shown by Test number 11.

One factor, which was brought out by subsequent efforts to retrieve metals from solution, was the amount of free add (F.A.) contained in the pregnant solution (liquor). A measurement of this F.A. was carried out for Test number 11, and found to be 98.7 g/l, measured as $H_2SO_4$. This was considered an excessive amount and consequently, the amount of HCl, and proportionally the amount of $HNO_3$, were decreased for Test number 12, to the extent that the F.A. measured for the Liquor of Test no. 12 was 8.25 g/l. It is apparent from the results obtained for Test number 12, that the decrease in the amount of acid had a pernicious effect on the dissolution of the metals.

EXAMPLE NUMBER 5

Test number 13 and test number 14 were attempts at increasing the percent solids of the slurry from 28% to 40%. These tests had to be terminated, in one case because of leakage from the autoclave's stainless steel relief valve, and in the other due to dissolution of the oxygen valve. Test number 15 was devised as a repeat of Test number 13 and 14. Test number 16 was an attempt to replace $O_2$ with air.

A concentrate sample weighing 8 kg was ground all at once at 65% solids for 44 minutes in a 10 kg ball mill, to give a grind of approximately 95%-200 mesh. The sample was filtered, then repulped in water and placed in an 18.5 liter glass lined autoclave. Agitation was then started. Concentrated HCl was added followed by concentrated $HNO_3$. The vessel was then sealed and steam was applied to the heating jacket. Once at a desired temperature, oxygen was injected and maintained at a specified pressure. Upon completion of the test, the pulp was removed, filtered and the solid cake washed and dried.

Conditions and results are shown in Tables 11 and 12.

TABLE 11

Increasing the Pulp Density of the Slurry
The Use of Air to Replace Oxygen

| Conditions | Test No 14 | Test No 15 | Test No 16 |
|---|---|---|---|
| HCl, (36–38%) (t/t conc.) | 0.945 | 0.945 | 0.945 |
| $HNO_3$ (69%) (t/t conc.) | 0.0142 | 0.0142 | 0.0213 |
| HCl/$HNO_3$ ratio by Volume | 75:1 | 75:1 | 50:1 |
| Pulp Density (% Solids) | 4 | 44 | 44 |
| Temp., (°C.) (Max) | 99 | 118 | 101 |
| $O_2$ Pressure (psig) | 50 | 50 | |
| Air Pressure (at temp) (psig) | | | 50 |
| Steam Pressure (at temp) (psig) | 0 | 15 | 10 |
| Total Pressure (psig) | 50 | 65 → 80 | 110 |
| Reaction Time (at temp) (h) | 1 | 2 | 3 |
| Final EMF of Preg. Sol'n (mV) | 426 | 824 | 384 |

TABLE 12

Increasing the Pulp Density of the Slurry
The Use of Air to Replace Oxygen

| Test No | Products | Amount g, ml | Assay (mg/l, %, g/t) Au | Pt | Pd | Cu | Ni | Fe | St/S= | % Distribution Au | Pt | Pd | Cu | Ni | Fe |
|---|---|---|---|---|---|---|---|---|---|---|---|---|---|---|---|
| 14 | Liquor | 9000 | 0.07 | 0.02 | 0.28 | 13200 | 7210 | 31800 | | 2.3 | 0.6 | 0.6 | 87.6 | 87.6 | 44.9 |
| | Wash | 10400 | 0.04 | 0.02 | 0.10 | | | | | | | | | | |
| | Sulphur Product | 544.0 | 5.10 | 30.02 | 141.0 | 1.16 | 2.71 | 18.2 | | | | | | | |
| | Residue | 5060 | 8.25 | 8.5 | 96.3 | 0.37 | 0.32 | 8.35 | | | | | | | |
| | Head (Calc'd) | 8000 | 5.70 | 7.47 | 71.3 | 2.51 | 1.61 | 11.84 | 100.0 | 100.0 | 100.0 | 100.0 | 100.0 | 100.0 | 100.0 |
| | Head (Direct) | | 6.67 | 4.59 | 85.0 | 2.54 | 1.80 | 12.50 | | | | | | | |
| 15 | Liquor | 9360 | 3.61 | 0.57 | 38.1 | 18000 | 7470 | 42300 | 9550 | 96.3 | 23.2 | 88.0 | 99.0 | 90.8 | 68.8 |
| | Wash | 7250 | 1.15 | 0.18 | 11.5 | | | | | | | | | | |
| | Residue | 4168.4 | 0.39 | 5.29 | 14.5 | 0.05 | 0.21 | 5.4 | | | | | | | |
| | Head (Calc'd) | 8000.0 | 5.5 | 3.6 | 63 | 2.62 | 1.19 | 8.92 | | 100.0 | 100.0 | 100.0 | 100.0 | 100.0 | 100.0 |
| | Head (Direct) | | 6.67 | 4.59 | 85.0 | 2.54 | 1.80 | 12.50 | | | | | | | |
| 16 | Liquor | 9100 | 0.02 | 0.02 | 0.02 | 11600 | 6400 | 31900 | 1290 | 0.9 | 1.0 | 0.1 | 81.4 | 82.0 | 49.1 |
| | Wash | 11180 | 0.02 | 0.02 | 0.0 | | | | | | | | | | |
| | Residue | 4971.4 | 8.80 | 8.02 | 113 | 0.64 | 0.34 | 8.0 | | | | | | | |
| | Head (Calc'd) | 8000.0 | 5.5 | 5.0 | 70 | 2.14 | 1.17 | 9.76 | | 100.0 | 100.0 | 100.0 | 100.0 | 100.0 | 100.0 |
| | Head (Direct) | | 6.67 | 4.59 | 85.0 | 2.54 | 1.80 | 12.50 | | | | | | | |

The results obtained in Test number 15 at increased pulp density showed no major differences with those obtained at lower densities, even at the ratio HCl:$HNO_3$ used (75:1). Nevertheless, it is felt that a 50:1 ratio would provide better dissolution rates.

The substitution of oxygen for air in Test number 16 did not fare well, due mainly to the geometry of the autoclave. The free space available was not enough to contain the necessary amount of air. Air pressure could not be increased above 50 psig., due to the reaction that ensued, creating pressures above 100 psig, near the designed pressure limits of the autoclave. The use air may still be possible in a larger autoclave with an increased pressure rating. A sample taken at one hour showed an EMF of 631 mV, then with decreasing $O_2$ available at two hours the EMF reading was 639 mV. AT the end of three hours with no more $O_2$ available it had dropped to 384 mV.

EXAMPLE 6

The leaching of concentrates (tests number 7 and 16) left considerable amount of Pt (from 60 to 76%) in the residue.

Test work was planned to recover Pt from the leach residue by physical means, using flotation, magnetic separation and gravity separation once the particle size containing most of the Pt was determined.

The leach residue obtained in test number 11 was used for this test.

Test number 11A was conducted at pH=7. No reagents were added except for frother.
The results are shown in Table 13.

TABLE 13

Preliminary Flotation Test on Leach Residue

| | | Assay (g/t) | | % Distribution | |
|---|---|---|---|---|---|
| Product | % Weight | Pt | Pd | Pt | Pd |
| R. Conc. | 52.71 | 4.67 | 21.9 | 83.5 | 91.8 |
| S. fraction | 0.03 | 10.6 | 113.0 | 0.1 | 0.3 |
| R. Tail | 47.26 | 1.02 | 2.11 | 16.4 | 7.9 |
| Head (Calc'd) | 100.00 | 2.95 | 12.57 | 100.0 | 100.0 |
| Head (Direct) | | 3.43 | 12.0 | | |

| | Sulfur Distribution | | |
|---|---|---|---|
| Product | % Weight | S % | S % Dist. |
| R. Conc. | 52.71 | 0.52 | 46.0 |
| R. Tail | 47.26 | 0.68 | 54.0 |
| Head (Calc'd) | 99.97 | 0.60 | 100.0 |

A remarkable concentration of Pt and Pd was obtained in the above test, considering the fact that S is almost evenly distributed in both the rougher concentrate and rougher tailing fractions.

Table 14 shows the size fractions analysis conducted on the tailing fraction of Test number 11A.

TABLE 14

Flotation Tailing-Size Fraction Analysis

| | Platinum | | | | |
|---|---|---|---|---|---|
| Fraction | Weight | | Assay | % Distribution, Pt | |
| mesh | Grams | % | g/t Pt | Ind | Cum |
| 150 | 2.1 | 0.9 | 2.18 | 2.0 | 2.0 |
| 200 | 10.1 | 4.5 | 1.66 | 7.3 | 9.3 |
| 270 | 36.8 | 16.3 | 0.93 | 14.9 | 24.1 |
| 400 | 29.9 | 13.3 | 1.58 | 20.5 | 44.6 |
| −400 | 146.5 | 65.0 | 0.87 | 55.4 | 100.0 |
| Total | 225.4 | 100.0 | 1.02 | 100.0 | |

| | Palladium | | | | |
|---|---|---|---|---|---|
| Fraction | Weight | | Assay | % Distribution, Pd | |
| mesh | Grams | % | g/t Pd | Ind | Cum |
| 150 | 2.1 | 0.9 | 15.90 | 7.0 | 7.0 |
| 200 | 10.1 | 4.5 | 2.59 | 5.5 | 12.5 |
| 270 | 36.8 | 16.3 | 1.32 | 10.2 | 22.8 |
| 400 | 29.9 | 13.3 | 2.36 | 14.9 | 37.6 |
| −400 | 146.5 | 65.0 | 2.02 | 62.4 | 100.0 |
| Total | 225.4 | 100.0 | 2.11 | 100.0 | |

| | Sulfur | | | | |
|---|---|---|---|---|---|
| Fraction | Weight | | Assay | % Distribution, S | |
| mesh | Grams | % | % S | Ind | Cum |
| 150 | 2.1 | 0.9 | 9.99 | 13.7 | 13.7 |
| 200 | 10.1 | 4.5 | 0.76 | 5.0 | 18.7 |
| 270 | 36.8 | 16.3 | 0.56 | 13.5 | 32.2 |
| 400 | 29.9 | 13.3 | 0.58 | 11.3 | 43.5 |
| −400 | 146.5 | 65.0 | 0.59 | 56.5 | 100.0 |
| Total | 225.4 | 100.0 | 0.68 | 100.0 | |

EXAMPLE 7

The leach residue obtained from Test number 14 was subjected to high intensity magnetic separation. The result is shown in Table 15.

TABLE 15

| Magnetic Separation Applied to Leach Residue | | | |
|---|---|---|---|
| Fraction | % Weight | % Fe | g/t Pt |
| Mags | 22.0 | 8.47 | 9.98 |
| Non Mags | 78.0 | 8.49 | 4.64 |

EXAMPLE 8

Atmospheric leaching would be an alternative to pressure leaching if the ratio of HCl:HNO$_3$ is increased to the normal aqua regia ratio of 3:1, and if the nitrous gases obtained from the reaction are captured, oxidized and recirculated to the vessel. Test number 17 was designed to find out the behaviour of such a reaction.

A concentrate sample was ground to approximately 95%−200 mesh, filtered and repulped with water in a reaction kettle. Agitation was then started. Concentrated HCl was then added followed by concentrated HNO$_3$. The kettle was then heated. Conditions and results are shown in Tables 16a and 16b.

TABLE 16A

| Atmospheric Leach with Aqua Regia | |
|---|---|
| Conditions | Test No 17 |
| HCl, (36–38%) (t/t conc.) | 1.89 |
| HNO$_3$ (69%) (t/t conc.) | 0.145 |
| HCl/HNO$_3$ ratio by Volume | 13 |
| Pulp Density (% Solids) | 44 |
| Temp., (°C.) | 93 |
| O$_2$ Pressure (psig) | Atm |
| Reaction Time (hours) | 7 |
| Final EMF of Preg. Sol'n (mV) | 420 |

TABLE 16B

| Test | | Assay (mg/l) | | | | | | |
|---|---|---|---|---|---|---|---|---|
| No | Product | Au | Pt | Pd | Cu | Ni | Fe | S |
| 17 | Liquor | 5.10 | 0.17 | 54.1 | 30800 | 19400 | 56800 | 2270 |

Several problems were encountered in the running of Test number 17, of which major ones were the increase in volume and the foaming of the concentrate. Attempts were made at decreasing the violence of the reaction by stage addition of HNO$_3$. Still, there was an extreme foaming which increased the original volume of the concentrate by 10 times. Under these circumstances, there was no proper contact of the solution with the foam. Only the solution was assayed as the remainder of the residue was deemed not to be representative. Final EMF of 420 mV predicted good dissolution rate of Cu, Ni, and Fe but possibly low dissolution for the Au and PGM.

EXAMPLE 9

Test work carried out to this point, showed that very good leaching results could be obtained for An, Pd, Cu and Ni but not so for Pt. Maximum recovery obtained for Pt was 38%. In an effort to try and put more Platinum in solution, two tests were designed which would use the best leaching conditions found so far, but increasing the reaction time from 2 to 5 hours, then followed with re-treatment of the leach residue with a stronger leaching solution (aqua regia) for a further 5 hour reaction time.

Test number 18 used direct concentrate, and test number 19 used concentrate calcine.

Concentrate samples weighing 8 kg were ground at 65% solids for 44 minutes in a 10 kg ball mill, to give a grind of approximately 95%–200 mesh. The samples were filtered and dried The sample for test number 18 was repulped in water and placed in an 18.5 liter glass-lined autoclave. Agitation was then started. Concentrated HCl was added followed by concentrated $HNO_3$. The vessel was sealed and steam applied to the heating jacket. Once the desired temperature was attained, oxygen was injected and maintained at a specified pressure. Upon completion of the test, the pulp was removed, filtered and the solid cake residue washed. The residue was repulped in water and returned to the autoclave where HCl and $HNO_3$ followed. The vessel was sealed again and heat applied. Once again, at the desired temperature, oxygen was injected and maintained at a specified pressure. Upon completion of the test, the pulp was removed, filtered and the solid cake residue washed and dried.

The sample for test number 19 was dried and split into 500 g charges for roasting in a furnace. Residence time in the furnace was 45 minutes, and the sample was rabbled continuously by hand. On removal of the sample from the furnace, it was rabbled in the open air for a further 5 minutes and let cool. Finally, all the 500 g charges were mixed together.

Leaching in the autoclave proceeded as for Test number 18. The conditions under which the tests were run and the conditions and results are shown respectively in Tables 17a and 17b. Table 18 shows the overall distributions.

TABLE 17A

| | Intensive Leaching of Concentrate and Calcine | | | |
|---|---|---|---|---|
| Conditons | Test No 18 Stage 1 | Test No 19 Stage 1 | Test No 18 Stage 2 | Test No 19 Stage 2 |
| Weight, g | 8000 | 7479 | 6446.6 | 6400.0 |
| HCl, (36–38%) (t/t conc.) | 0.945 | 0.945 | 0.586 | 0.590 |
| $HNO_3$, (69%) (t/t conc.) | 0.023 | 0.0213 | 0.220 | 0.222 |
| $HCl/HNO_3$ ratio | 50/1 | 50/1 | 3/1 | 3/1 |
| % Solids | 44 | 44 | 51 | 51 |
| Temp., °C. (max) | 105 | 87 | 88 | 88 |
| $O_2$ Pressure (psig) | 50 | 50 | 50 | 50 |
| Total Pressure (psig) | 100 | 95 | 100 | 100 |
| Reaction Time (per stage) (hours) | 5 | 5 | 5 | 5 |

TABLE 17B

| | | | Intensive Leaching of Concentrate and Calcine | | | | | | | | | | | |
|---|---|---|---|---|---|---|---|---|---|---|---|---|---|---|
| Test | | Amount | Assay (mg/l, %, g/t) | | | | | | % Distribution | | | | | |
| No | Products | g/ml | Au | Pt | Pd | Cu | Ni | Fe | Au | Pt | Pd | Cu | Ni | Fe |
| 18 STAGE 1 | Liquor | 5800 | 2.97 | 0.96 | 27.6 | 14600 | 9580 | 44900 | 94.3 | 23.8 | 83.6 | 98.6 | 95.0 | 60.9 |
| | Wash | 13140 | 1.39 | 0.45 | 12.8 | 7150 | 4450 | 19600 | | | | | | |
| | Fines | 33.4 | 4.16 | 2.15 | 34.5 | 1.47 | 1.05 | 6.16 | 0.3 | 0.1 | 0.3 | 0.3 | 0.3 | 0.2 |
| | Sulphur Product | 67.8 | 2.22 | 7.79 | 112 | 2.13 | 4.60 | 12.3 | 0.4 | 1.1 | 1.9 | 0.8 | 2.7 | 1.1 |
| | Residue | 6446.6 | 0.29 | 5.61 | 8.62 | 0.016 | 0.038 | 4.99 | 5.0 | 75.0 | 14.2 | 0.3 | 2.0 | 37.8 |
| | Head (Calc'd) | 8000.0 | 4.71 | 6.03 | 49.07 | 2.26 | 1.50 | 10.6 | 100.0 | 100.0 | 100.0 | 100.0 | 100.0 | 100.0 |
| | Head (Direct) | | 5.32 | 5.72 | 57.10 | 2.62 | 1.85 | 11.8 | | | | | | |
| 18 STAGE 2 | Liquor | 8730 | 0.15 | 0.75 | 1.44 | 442 | 386 | 2720 | 80.8 | 32.1 | 37.7 | 64.5 | 46.5 | 12.4 |
| | Wash | 16200 | 0.09 | 0.18 | 0.40 | 103 | 90 | 642 | | | | | | |
| | Fines | 144.2 | 0.02 | 0.02 | 0.03 | 0.008 | 0.002 | | 0.1 | 0.0 | 0.0 | 0.1 | 0.0 | 0.0 |
| | Sulphur Product | 106.3 | 1.69 | 9.23 | 113 | 2.14 | 4.65 | 12.00 | 5.2 | 3.3 | 17.5 | 26.5 | 47.6 | 4.6 |
| | Residue | 4746.3 | 0.10 | 4.01 | 7.93 | 0.009 | 0.013 | 4.84 | 13.9 | 64.6 | 54.8 | 8.9 | 5.9 | 83.0 |
| | Head (Calc'd) | 6446.6 | 0.53 | 4.57 | 10.66 | 0.133 | 0.161 | 4.29 | 100.0 | 100.0 | 100.0 | 100.0 | 100.0 | 100.0 |
| | Head (Direct) | | 0.29 | 5.61 | 8.62 | 0.016 | 0.038 | 4.99 | | | | | | |
| 19 STAGE 1 | Liquor | 6040 | 3.61 | 3.94 | 38.0 | 19900 | 14700 | 54100 | 95.6 | 94.3 | 91.4 | 96.1 | 91.6 | 59.7 |
| | Wash | 21330 | 0.81 | 0.86 | 8.41 | 3780 | 2700 | 13900 | | | | | | |
| | Residue | 6400.0 | 0.28 | 0.40 | 6.06 | 0.130 | 0.210 | 6.55 | 4.4 | 5.7 | 8.6 | 3.9 | 8.4 | 40.3 |
| | Head (Calc'd) | 7479.0 | 5.45 | 5.99 | 59.86 | 2.80 | 2.14 | 13.9 | 100.0 | 100.0 | 100.0 | 100.0 | 100.0 | 100.0 |
| | Head (Direct) | | 5.61 | 6.48 | 59.20 | 2.62 | 1.85 | 11.8 | | | | | | |
| 19 STAGE 2 | Liquor | 10820 | 0.08 | 0.02 | 1.38 | 280 | 550 | 8870 | 75.8 | 22.0 | 53.7 | 55.6 | 61.9 | 34.2 |
| | Wash | 20290 | 0.02 | 0.02 | 0.13 | 27 | 50 | 774 | | | | | | |
| | Residue | 4606.3 | 0.09 | 0.48 | 3.30 | 0.062 | 0.093 | 4.67 | 24.2 | 78.0 | 46.3 | 44.4 | 38.1 | 65.8 |
| | Head (Calc'd) | 6400.0 | 0.27 | 0.44 | 5.13 | 0.101 | 0.176 | 5.11 | 100.0 | 100.0 | 100.0 | 100.0 | 100.0 | 100.0 |
| | Head (Direct) | | 0.28 | 0.40 | 6.06 | 0.130 | 0.210 | 6.55 | | | | | | |

TABLE 18

| | | Overall Distributions | | | | | |
|---|---|---|---|---|---|---|---|
| | | % Distribution | | | | | |
| Test No | Stages | Au | Pt | Pd | Cu | Ni | Fe |
| 18 | 1st | 94.3 | 23.8 | 83.6 | 98.6 | 95.1 | 60.9 |
| | 2nd | 4.0 | 24.1 | 3.9 | 0.2 | 0.9 | 4.7 |
| | 1st & 2nd | 98.3 | 47.9 | 87.5 | 98.8 | 96.0 | 65.6 |
| 19 | 1st | 95.6 | 94.3 | 91.3 | 96.0 | 91.6 | 59.8 |
| | 2nd | 3.3 | 1.3 | 4.7 | 2.2 | 5.2 | 13.7 |
| | 1st & 2nd | 98.9 | 95.5 | 96.0 | 98.2 | 96.8 | 73.5 |

As can be seen from Table 18, it took two leaching stages of 5 hours duration each to obtain less than half of the Pt content in solution from the concentrate treated directly (Test number 18). In contrast, the roasted concentrate (Test number 19) yielded a 94.3% dissolution of the Pt in the first stage alone.

EXAMPLE 10 tray/boat was taken out, the charge rabbled for an addition 5 minutes in open air and finally let cool.

Table 19 shows the roasting conditions for each sample.

TABLE 19

| | Roasting Conditions | | | | | |
|---|---|---|---|---|---|---|
| | Test No 19 | Test No 20 | Test No 21 | Test No 22 | Test No 23 | Test No 24 |
| Charge, g | 500 | 3600 | 3600 | 500 | 500 | 500 |
| Total material roasted, g | 8000 | 7200 | 7200 | 7200 | 7200 | 7200 |
| Total roast obtained, g | 7800 | 7000 | 7000 | 7000 | 7000 | 7000 |
| Temperature, °C. | 760 | NA | NA | 482→650 | 482→650 | 482→650 |
| Time, minutes (per charge) | 45 | 45 | 45 | 45 | 45 | 45 |
| Muffle dimensions, inches | 9½ × 9½ × 14 | NA | NA | 9½ × 0½ × 14 | 9½ × 0½ × 14 | 9½ × 0½ × 14 |
| Air velocity, F.P.M. | 50–55 | NA | NA | 50–55 | 50–55 | 50–55 |
| Continuous rabbling | yes | yes | yes | yes | yes | yes |

The excellent dissolution for all metals in Test number 19, in which the concentrate was roasted prior to leaching, prompted a series of tests to investigate leaching reaction time to bring it in line with previous test work and the use of HCl as a leaching agent without $HNO_3$.

Concentrate composites weighing 8 kg were ground for 44 minutes at 65% solids in a 10 kg ball mill, to obtain a grinding of approximately 95%–200 mesh. The samples were filtered and dried. The charges were cut to be roasted in an assay furnance. The furnace's muffle was heated to 750° C. (1400° F.) with closed doors. Once the temperature was reached, the doors were opened. The tray or boat with the charge evened to an even height of two inches was placed in the muffle for 45 minutes with continuous rabbling by hand. The Table 20 shows the head analysis of concentrate and roasted composites.

TABLE 20

| | | Head Analysis of Composites | | | | | | |
|---|---|---|---|---|---|---|---|---|
| Composite | Test | g/t | | | % | | | |
| No. | No | Au | Pt | Pd | Cu | Ni | Fe | St |
| 2 | 19 | 5.61 | 6.48 | 59.2 | 2.80 | 2.13 | 12.5 | 7.83 |
| 2 | 20–22 | 4.93 | 5.62 | 56.7 | 2.66 | 2.02 | 12.0 | NA |
| 4 | 23–24 | 6.38 | 5.89 | 82.15 | 3.41 | 1.95 | 12.3 | 7.66 |

| | | Analysis of Roasted Composites | | | | | | | |
|---|---|---|---|---|---|---|---|---|---|
| Composite | Test | g/t | | | % | | | | |
| No. | No | Au | Pt | Pd | Cu | Ni | Fe | St | S= |
| 2 | 19 | 5.88 | 6.39 | 63.5 | 2.83 | 2.15 | 12.6 | 2.17 | 0.76 |
| 2 | 20–22 | 5.39 | 5.98 | 59.6 | 2.73 | 2.08 | 12.0 | 1.63 | 0.62 |
| 4 | 23–24 | 6.35 | 6.00 | 82.0 | 3.65 | 2.00 | 13.1 | 1.07 | 0.19 |

EXAMPLE 11

Roasted concentrate samples were pulped in water and put in an 18.5 liter glass-lined autoclave. Agitation was started. Concentrated HCl was introduced followed by concentrated $HNO_3$, except for Test number 21, in which only HCl was used. The autoclave was sealed and steam injected in the heating jacket. Once the pre-determined temperature of the pulp was obtained, the vessel was pressurized with oxygen. Temperature and pressure were monitored throughout the test. After the prescribed retention time, the pulp was removed, filtered and the solid cake residue was washed and dried.

The leaching conditions are shown in Table 21.

TABLE 21

| | Leaching Conditions | | | | | |
|---|---|---|---|---|---|---|
| | Test 19 | Test 20 | Test 21 | Test 22 | Test 23 | Test 24 |
| Weight, g | 7479 | 7000 | 7000 | 7000 | 7000 | 7000 |
| HCl, (t/t conc.) | 0.945 | 0.945 | 0.945 | 0.945 | 1.08 | 1.08 |
| $HNO_3$ (t/t conc.) | 0.0213 | 0.0213 | — | 0.0213 | 0.024 | 0.024 |
| HCl/$HNO_3$ ratio | 50/1 | 50/1 | — | 50/1 | 50/1 | 50/1 |
| % Solids | 41.8 | 43.5 | 43.5 | 43.5 | 40.2 | 40.2 |
| Temperature, °C. | 87 | 84 | 84 | 84 | 88 | 90 |
| O2 pressure, (psig) | 50 | 50 | 50 | 50 | 50 | 50 |
| Total pressure, (psig) | 95 | 95 | 95 | 95 | 100 | 100 |
| Time, hours | 5 | 5 | 5 | 2 | 2 | 5 |

TABLE 21-continued

| | Leaching Conditions | | | | | |
|---|---|---|---|---|---|---|
| | Test 19 | Test 20 | Test 21 | Test 22 | Test 23 | Test 24 |
| Number of Stages | 2* | 1 | 1 | 1 | 1 | 1 |

*Stage two consisted in the re-treatment of stage one residue, under the same conditions except for a change in the ratio of HCl to HNO₃ from 50:1 to 3:1.

There was little added advantage obtained from this treatment, so for purposes of comparison with the other tests, stage 2 has not been considered.

The results of the leaching tests are shown in Table 22.

From the distribution figures on Table 23, the following observations can be made.

1) Test number 19 constituted the "leaching reference test".
2) Test number 20, aimed at repeating test number 19

TABLE 22

| | | | Leaching Results | | | | | | | | | | |
|---|---|---|---|---|---|---|---|---|---|---|---|---|---|
| Test | | Amount | Assay (mg/l, g/l; %, g/t) | | | | | | % Distribution | | | | |
| No | Products | g, ml | Au | Pt | Pd | Cu | Ni | Fe | Mg | Au | Pt | Pd | Cu | Ni |
| 19 | Liquor | 6.04 | 3.61 | 3.94 | 38.0 | 19.90 | 14.70 | 54.10 | 8.60 | 53.5 | 53.1 | 51.3 | 57.5 | 55.6 |
| | Wash | 21.33 | 0.81 | 0.86 | 8.41 | 3.78 | 2.70 | 13.90 | 1.69 | 42.1 | 41.1 | 40.1 | 38.6 | 36.0 |
| | Residue | 6.40 | 0.28 | 0.52 | 6.06 | 0.13 | 0.21 | 6.55 | 7.84 | 4.40 | 5.70 | 8.7 | 3.90 | 8.4 |
| | Head (Calc'd) | 7.479 | 5.45 | 5.99 | 59.86 | 2.80 | 2.14 | 13.9 | | 100.0 | 100.0 | 100.0 | 100.0 | 100.0 |
| | Head (Direct) | 7.479 | 5.88 | 6.39 | 63.50 | 2.83 | 2.15 | 12.6 | | | | | | |
| 20 | Liquor | 3.80 | 4.75 | 4.88 | 46.8 | 19.7 | 13.6 | 41.5 | 10.10 | 60.7 | 53.9 | 51.9 | 46.4 | 42.8 |
| | Wash | 13.00 | 0.512 | 0.785 | 7.33 | 3.39 | 2.25 | 7.04 | 1.71 | 22.4 | 29.7 | 27.8 | 27.3 | 24.2 |
| | Residue | 5.04 | 1.00 | 1.12 | 13.8 | 0.84 | 0.79 | 9.44 | | 16.9 | 16.4 | 20.3 | 26.3 | 33.0 |
| | Head (Calc'd) | 7.00 | 4.25 | 4.91 | 48.96 | 2.30 | 1.73 | 10.4 | | 100.0 | 100.0 | 100.0 | 100.0 | 100.0 |
| | Head (Direct) | 7.00 | 5.39 | 5.98 | 59.6 | 2.66 | 2.02 | 12.0 | | | | | | |
| 21 | Liquor | 2.50 | 1.70 | 0.664 | 37.2 | 19.0 | 12.8 | 8.90 | 10.10 | 12.5 | 4.40 | 29.5 | 32.2 | 26.2 |
| | Wash | 17.0 | 0.324 | 0.122 | 6.66 | 3.50 | 2.27 | 7.04 | 1.87 | 16.2 | 5.60 | 35.9 | 40.3 | 31.5 |
| | Residue | 5.28 | 4.58 | 6.37 | 20.7 | 0.77 | 0.96 | 8.18 | | 71.2 | 90.0 | 34.6 | 27.5 | 42.3 |
| | Head (Calc'd) | 7.00 | 4.85 | 5.34 | 45.07 | 2.11 | 1.75 | 8.2 | | 100.0 | 100.0 | 100.0 | 100.0 | 100.0 |
| | Head (Direct) | 7.00 | 5.39 | 5.98 | 59.6 | 2.73 | 2.08 | 12.0 | | | | | | |
| 22 | Liquor | 5.00 | 4.46 | 4.95 | 43.9 | 18.5 | 13.8 | 50.5 | 10.3 | 60.0 | 55.6 | 50.1 | 45.3 | 44.0 |
| | Wash | 10.7 | 0.510 | 1.510 | 13.50 | 5.53 | 3.93 | 15.8 | 3.04 | 14.7 | 36.3 | 33.0 | 28.9 | 26.8 |
| | Residue | 6.35 | 1.48 | 0.57 | 11.70 | 0.83 | 0.72 | 8.29 | 7.81 | 25.3 | 8.10 | 17.0 | 25.8 | 29.2 |
| | Head (Calc'd) | 7.00 | 5.31 | 6.36 | 62.61 | 2.92 | 2.24 | 13.5 | | 100.0 | 100.0 | 100.0 | 100.0 | 100.0 |
| | Head (Direct) | 7.00 | 5.39 | 5.98 | 59.6 | 2.73 | 2.08 | 12.0 | | | | | | |
| 23 | Liquor | 5.12 | 4.74 | 4.31 | 51.30 | 19.30 | 11.80 | 56.40 | 10.30 | 53.1 | 50.9 | 45.9 | 40.2 | 42.6 |
| | Wash | 15.38 | 1.33 | 1.24 | 14.50 | 5.35 | 3.17 | 16.70 | 2.84 | 44.8 | 44.0 | 39.0 | 33.5 | 34.3 |
| | Residue | 5.05 | 0.19 | 0.43 | 17.00 | 1.28 | 0.65 | 7.89 | 9.44 | 2.10 | 5.0 | 15.0 | 26.3 | 23.1 |
| | Head (Calc'd) | 7.00 | 6.53 | 6.19 | 81.66 | 3.51 | 2.03 | 13.5 | | 100.0 | 100.0 | 100.0 | 100.0 | 100.0 |
| | Head (Direct) | 7.00 | 6.35 | 6.00 | 82.00 | 3.65 | 2.00 | 13.1 | 8.72 | | | | | |
| 24 | Liquor | 5.76 | 4.34 | 4.08 | 51.1 | 19.6 | 12.10 | 59.20 | 11.80 | 55.5 | 53.5 | 49.8 | 44.1 | 47.0 |
| | Wash | 16.2 | 1.190 | 1.14 | 13.70 | 5.35 | 3.20 | 15.40 | 3.24 | 42.8 | 42.0 | 37.6 | 33.9 | 35.0 |
| | Residue | 4.95 | 0.16 | 0.40 | 15.00 | 1.14 | 0.54 | 7.10 | 9.41 | 1.80 | 4.5 | 12.6 | 22.0 | 18.0 |
| | Head (Calc'd) | 7.00 | 6.44 | 6.28 | 84.36 | 3.66 | 2.12 | 13.5 | | 100.0 | 100.0 | 100.0 | 100.0 | 100.0 |
| | Head (Direct) | 7.00 | 6.35 | 6.00 | 82.00 | 3.65 | 2.00 | 13.1 | 8.72 | | | | | |

Table 23 shows the summary of the distribution of the metals into the leached product (liquors) for tests number 19-24.

TABLE 23

| | Metal Distribution in Liquors | | | | |
|---|---|---|---|---|---|
| Test | % DISTRIBUTION | | | | |
| No | Au | Pt | Pd | Cu | Ni |
| 19 | 95.6 | 94.3 | 91.3 | 96.0 | 91.6 |
| 20 | 83.1 | 83.6 | 79.7 | 73.7 | 67.0 |
| 21 | 28.7 | 10.0 | 65.4 | 72.5 | 57.7 |
| 22 | 74.7 | 91.9 | 83.1 | 74.2 | 70.8 |
| 23 | 97.9 | 94.9 | 84.9 | 73.7 | 76.9 |
| 24 | 98.3 | 95.5 | 87.4 | 78.0 | 82.0 | did not show quite as good results, although platinum recovery was still over 80%. Recoveries for the other valuable metals were also down. Inconsistencies in the roasting procedure were deemed to account for the differences.

3) In test number 21, only HCl was used in the leaching step. The roasting procedure was similar to that of test number 20. Very poor recoveries were obtained for all metals, more so in the case of platinum.

4) At this point it was made clear that the roasting procedure used for test number 19, had to be identically reproduced in order to obtain similar leaching results. The reported roasting temperature for test number 19 was that at which the muffle was heated, before any roasting took place. There was a lag time between this temperature and the one at which the boat with the sample was introduced into the open muffle. Once the boat was in the muffle, there was a further dip in the temperature, due to a cold boat, and finally heat was gained from then on from the furnace itself and the reaction. In general, this was the procedure followed for the roasting of test number 22, 23 and 24.

5) Gold and platinum recoveries came back to the expected levels—except for an unexplained low figure for gold in test number 22. The most notable differences were the low recoveries obtained for Cu and Ni, and to a lesser extent that of Pd. Possibly the problem may be attributed to the formation of certain compounds, such as ferrites of Cu, Ni and Pd, during the roasting process, and that these ferrites are more difficult to dissolve under the present leaching conditions.

EXAMPLE 12

Parallel to the test work on concentrate calcines, an effort was made to obtain better Pt dissolution from direct concentrates by increasing the temperature of reaction to 135° C. or higher.

Test work using high grade concentrate, with a sulfur (S) content of 21.6% in a 28% solids slurry, attained maximum temperature from 105°–130° C. (Test number 7–10).

Test work using lower grade concentrate, with a S content of 8.75% and 40% solids slurry showed maximum reaction temperature of 118° C. (Test number 11).

In the tests mentioned above, the difference in temperature obtained was mainly due to the addition of different amounts of $HNO_3$: the more $HNO_3$ added, the higher temperature attained.

It seems that if all the oxygen needed for the reaction is available from the start, oxidation proceeds very rapidly and produces high temperature and pressure.

In the present case, the reaction had to be moderated due to the constraints of autoclave design. This was accomplished by the use of small amounts of $HNO_3$ in a closed autoclave, with an overpressure of oxygen.

Two other factors affect the temperature of an oxidizing reaction: the pulp density (percent solids) and the S grade of concentrate.

As mentioned above, for test number 11, a concentrate sample with a S content of 8.75% (Comp. No. 1) was leached at 40% solids. The process was auto-thermal, but the maximum temperature obtained was only 118° C. To increase the temperature of reaction, it was deemed appropriate to increase the S content of the pulp. To this effect, a composite was made by mixing high grade concentrate and Comp No. 2, to give a S content of approximately 10% (Comp. No. 5).

It remained to be seen if the heat of reaction released would produce a temperature of 135° C. or higher as planned. A sample of Comp. No. 5 weighing 8 kg was ground at 65% solids for 44 minutes in a 10 kg ball mill, to give a grind of approximately 95%–200 mesh. The sample was filtered, then repulped in water and placed in an 18.5 liter glass-lined autoclave. Agitation was then started. Concentrated HCl was added followed by concentrated, $HNO_3$. The vessel was then sealed and steam was applied to the heating jacket. Once at the desired temperature, oxygen was injected and maintained at a specified pressure. Upon completion of the test, the pulp was removed, filtered and the solid cake filtered, washed and dried. Conditions and results are shown respectively in Tables 24 and 25.

TABLE 24

| Increasing Leaching Temperature | |
|---|---|
| Conditions | Test No 25 |
| HCl (36–38%) (t/t conc.) | 0.945 |
| $HNO_3$ (69%) (t/t conc.) | 0.023 |
| $HCl/HNO_3$ Ratio by Volume | 50/1 |
| Pulp Density (% Solids) | 41.9 |
| Max. Temperature, (°C.) | 125 |
| $O_2$ Pressure, (psig) | 50 |
| Total pressure, (psig) | 100 |
| Reaction Time, (h) | — |

TABLE 25

| Product | Amount | Au | Pt | Pd | Cu | Ni | Fe | So/S=/St % | Mg |
|---|---|---|---|---|---|---|---|---|---|
| Liquor | | | | | | | | | |
| Wash | | | | | | | | | |
| Residue | | 2.83 | 7.41 | 19.10 | 0.02 | 0.10 | 5.38 | 8.69 | 9.08 |
| Head (Calc'd) | 7500.0 | | | | | | | | |
| Head (Direct) | | 8.45 | 7.40 | 99.40 | 4.11 | 3.71 | 14.5 | 10.25/11.2 | |

Assay (mg/l, %, g/t)

Test number 25 did not achieve the desired temperature and was discarded.

A further composite was prepared to increase the S content of the sample to approximately 15% S (Comp. No. 6). Again, high grade concentrate was mixed with Comp. No. 2 for this purpose. The leaching test procedure (Test number 26) was identical to Test number 25 except for $O_2$ being injected from the very beginning of the test.

Conditions and test results are shown respectively in Tables 26 and 27.

TABLE 26

| Increasing Leaching Temperature | |
|---|---|
| Conditions | Test No 26 |
| HCl (26–38%)(t/t conc.) | 0.945 |
| $HNO_3$ (69%)(t/t conc.) | 0.023 |
| $HCl/HNO_3$ Ratio by Volume | 50/1 |
| Pulp Density (% Solids) | 41.9 |
| Max. Temperature, (°C.) | 139 |
| $O_2$ Pressure, (psig) | 50 |
| Total pressure, (psig) | 105 |
| Reaction Time, (h) | 5 |

TABLE 27

| Product | Amount g, ml | Assay (mg/l, %, g/t) | | | | | | So/S = /St % | Mg |
|---|---|---|---|---|---|---|---|---|---|
| | | Au | Pt | Pd | Cu | Ni | Fe | | |
| Liquor | 7760 | 0.42 | 0.72 | 72.8 | 41600 | 25900 | 81700 | 25100 | 6210 |
| Wash | 12040 | 0.120 | 0.170 | 16.50 | 9350 | 5510 | 17900 | 6770 | 1410 |
| Residue | 4972.3 | 19.00 | 14.70 | 48.80 | 0.025 | 0.14 | 9.78 | | |
| Head (Calc'd) | 7000.0 | 14.17 | 11.53 | 143.75 | 6.24 | 3.92 | 19.1 | 18.20 | |
| Head (Direct) | | 17.40 | 12.40 | 146.00 | 5.76 | 3.71 | 18.7 | 16.40 | |

Individual distributions are shown in Table 28.

TABLE 28

| | Amount | Individual Distributions % Distribution | | | | | |
|---|---|---|---|---|---|---|---|
| Product | g, ml | Au | Pt | Pd | Cu | Ni | Fe |
| Liquor | 7760 | 3.3 | 6.9 | 56.1 | 73.9 | 73.3 | 47.5 |
| Wash | 12040 | 1.5 | 2.5 | 19.7 | 25.8 | 24.2 | 16.1 |
| Residue | 4972.3 | 95.3 | 90.5 | 24.1 | 0.3 | 2.5 | 36.4 |
| Head (Calc'd) | 7000.0 | 100.0 | 100.0 | 100.0 | 100.0 | 100.0 | 100.0 |

Even though the reaction temperature of 135° C. or higher was achieved and sustained throughout the test, the recovery of precious metals in the solution was extremely poor. This fact was probably due to precipitation by the melting S. The melting temperature of S is around 120° C., and although $O_2$ was injected from the beginning of the test, melting of S occurred faster than its oxidation.

In order to find out if it was possible to keep S in solution by the addition of an organic S dispersant (Lignosol) to the slurry, a further test was conducted (test number 27). A new composition (Comp. No. 7) was prepared and the leaching test carried out similarly to test number 26, except for an increase in the addition of HCl and proportionately that of $HNO_3$.

The conditions and test results are shown respectively in Tables 29 and 30. Individual distributions are shown in Table 31.

TABLE 29

| Increasing Leaching Temperature | |
|---|---|
| Conditions | Test No 27 |
| HCl (26-38%)(t/t conc.) | 1.159 |
| $HNO_3$ (69%)(t/t conc.) | 0.026 |

TABLE 29-continued

| Increasing Leaching Temperature | |
|---|---|
| Conditions | Test No 27 |
| HCl/$HNO_3$ Ratio by Volume | 50/1 |
| Pulp Density (% Solids) | 41.9 |
| Max. Temperature, (°C.) | 132 |
| $O_2$ Pressure, (psig) | 50 |
| Total pressure, (psig) | 105 |
| Reaction Time, (h) | 5 |
| Lignosol, kg/t | 1 |

TABLE 30

| Product | Amount g, ml | Assay (mg/l, %, g/t) | | | | | | So/S = /St % | Mg |
|---|---|---|---|---|---|---|---|---|---|
| | | Au | Pt | Pd | Cu | Ni | Fe | | |
| Liquor | 8730 | 0.45 | 0.03 | 1.5 | 24900 | 13500 | 48500 | 1240 | 7930 |
| Wash | 16000 | 0.13 | 0.02 | 0.44 | 6750 | 3480 | 13500 | 1240 | 2100 |
| Residue | 5404.7 | 10.70 | 11.30 | 144.0 | 0.10 | 0.16 | 9.02 | | |
| Head (Calc'd) | 7500.0 | 8.51 | 8.22 | 106.47 | 4.41 | 2.43 | 15.0 | 18.20 | |
| Head (Direct) | | 8.16 | 7.20 | 94.30 | 4.06 | 2.54 | 14.1 | | |

TABLE 31

| | Amount | Individual Distributions % Distribution | | | | | |
|---|---|---|---|---|---|---|---|
| Product | g, ml | Au | Pt | Pd | Cu | Ni | Fe |
| Liquor | 8730 | 6.2 | 0.4 | 1.7 | 65.7 | 64.7 | 37.6 |
| Wash | 16000 | 3.3 | 0.5 | 0.9 | 32.6 | 30.6 | 19.2 |
| Residue | 5404.7 | 90.6 | 99.1 | 97.5 | 1.6 | 4.7 | 43.3 |
| Head (Calc'd) | 7500.0 | 100.0 | 100.0 | 100.0 | 100.0 | 100.0 | 100.0 |

No improvement was obtained in the recovery of precious metals by the addition of Lignosol. The test work indicates that in order to prevent the precipitation of precious metals, the temperature of reaction must be kept below the melting point of S.

The alternative would be to obtain a reaction temperature above 160° C. and preferably in the range of 200°–225° C., at which S re-oxidizes. These temperatures, however, will also produce elevated total pressures, whose major component is the vapor pressure of water. The vapor pressure of water rises very rapidly above 150° C. The rate of increase in pressure continues to rise with temperature and may result in uneconomical design parameters for the autoclave.

EXAMPLE 13

A test program was designed to investigate the main variables that affect roasting, i.e.: temperature, roasting period, rabbling. Concentrate composite No. 4 was used for this purpose. Charges weighing 500 g were used throughout the program.

Test RST 19 was the "roasting reference test", used for leaching test number 19, in which the muffle was heated to 760° C. with doors closed. The doors were then opened and the temperature allowed to come down to its lowest level. The cold boat with 500 g of dry sample, evened to a height of two inches, was introduced for a total time of 45 minutes, during which the sample was continuously rabbled by hand. The hot boat and sample were then taken out of the muffle, rabbled for 5 minutes and finally let to cool down to room temperature.

Test RST 20 was generally the same as RST 19, but with no rabbling.

Test RST 21 was the first of three at "higher temperatures". In this case, the muffle was heated to 982° C. with doors closed, the rest of the steps were similar to RST 19, except that no rabbling was performed.

Test RST 22 was the same as RST 21, but the duration was 90 minutes instead of 45.

Test RST 23 was the same as RST 21, but 30 minutes were used instead of 45.

One hundred gram samples of all roasting tests, including unroasted samples, were leached with $H_2SO_4$ and aqua regia ($HCl:HNO_3:3:1$) for five hours at 80° C.

The extraction results are shown in Table 32.

TABLE 32
Leaching of Roasted Products

| Test No. | Feed | Roasting Test | Leach | % Extraction Au | Pt | Pd | Cu | Ni | Fe |
|---|---|---|---|---|---|---|---|---|---|
| RST-19-1 | Comp 4 | 19 | $H_2SO_4$ | 4.0 | 3.7 | 0.8 | 71.8 | 12.4 | 4.6 |
| RST-19-2 | Comp 4 | 19 | Aqua Regia | 99.2 99.5 | 97.2 97.7 | 94.7 94.0 | 99.3 97.4 | 92.7 92.7 | 70.3 69.4 |
| RST-19-3 | Comp 4 | unroasted | $H_2SO_4$ | 3.3 | 3.5 | 0.8 | 3.3 | 5.5 | 6.7 |
| RST-19-4 | Comp 4 | unroasted | Aqua Regia | 85.2 99.7 | 18.4 36.5 | 89.1 92.8 | 98.2 99.4 | 93.7 96.3 | 68.7 72.2 |
| RST-20-1 | Comp 4 | 20 | $H_2SO_4$ | 7.7 | 3.5 | 1.6 | 75.4 | 16.5 | 11.6 |
| RST-20-2 | Comp 4 | 20 | Aqua Regia | 96.1 99.2 | 78.2 80.9 | 88.6 89.7 | 96.1 98.9 | 91.7 92.6 | 69.4 65.3 |
| RST-21-1 | Comp 4 | 21 | $H_2SO_4$ | 3.2 | 3.3 | 1.7 | 64.6 | 16.6 | 7.1 |
| RST-21-2 | Comp 4 | 21 | Aqua Regia | 98.2 99.1 | 82.0 84.1 | 88.8 88.2 | 89.9 89.8 | 89.1 88.6 | 67.1 62.9 |
| RST-22-1 | Comp 4 | 22 | $H_2SO_4$ | 4.5 | 3.7 | 1.8 | 52.4 | 16.6 | 3.6 |
| RST-22-2 | Comp 4 | 22 | Aqua Regia | 98.7 | 88.9 | 86.2 | 77.9 | 81.8 | 58.4 |
| RST-23-1 | Comp 4 | 23 | $H_2SO_4$ | 3.5 | 4.4 | 1.7 | 70.5 | 15.4 | 11.4 |
| RST-23-2 | Comp 4 | 23 | Aqua Regia | 98.7 | 78.4 | 90.5 | 98.0 | 93.4 | 70.1 |

It appears that the reference roast gives the best overall extraction for all metals.

At a higher temperature and no rabbling, the longer the roasting period the lower the extraction of metals. It is interesting to note that a 30 minute period—the shortest time used—gave comparable extractions to the reference test, except for platinum.

EXAMPLE 14

Since the reference roast gave the best leaching results, a series of tests was carried out to optimize this finding.

In test RST 25, the muffle was heated to 760° C. with closed doors. The doors were opened and the temperature was allowed to come down to its lowest level (604° C.–610° C.). The cold boat with 500 g of dry sample evened to a depth of two inches was introduced, which caused a further slip in the temperature (approximately 538° C.). Total roasting time was 30 minutes, during which the sample was continuously rabbled by hand. The hot boat and sample were taken out of the muffle and rabbled for a further five minutes and finally left to cool down to room temperature.

Test RST 26 was the same as RST 25, however 60 minutes roasting time was used.

Test RST 27 was generally the same as RST 25 however 90 minutes roasting time was used.

Test RST 28 was generally the same as RST 25 without rabbling.

Test RST 29 was generally the same as RST 26 without rabbling.

Test RST 30 was generally the same as RST 27 without rabbling.

The leaching extractions obtained from these tests are shown in Table 33.

TABLE 33
Leaching of Roasted Concentrate

| Test No. | % Extraction Au | Pt | Pd | Cu | Ni |
|---|---|---|---|---|---|
| Rst 25 | 99.4 | 95.2 | 95.1 | 97.7 | 93.6 |
| RST 26 | 99.5 | 98.3 | 95.2 | 97.0 | 92.6 |
| RST 27 | 99.3 | 98.6 | 93.2 | 97.1 | 90.9 |
| RST 28 | 98.9 | 74.5 | 86.4 | 99.3 | 95.9 |
| RST 29 | 99.2 | 87.8 | 90.5 | 97.8 | 93.2 |
| RST 30 | 99.3 | 96.7 | 89.7 | 95.2 | 90.0 |

From Table 33, it will be noted that rabbling seems to help considerably in obtaining good leaching conditions for platinum. With no rabbling, there is a trend for better leaching conditions with longer roasting periods for this metal, but the effect on copper and nickel is opposite. There is some improvement for palladium, but well below the figure obtained with rabbling.

EXAMPLE 15

A series of tests was carried out to investigate a roasting temperature of 482° C. At this temperature, better leaching results for copper and nickel were expected, since at lower temperatures, the formation of ferrites is curtailed. The series also aimed at finding out the effect of this low temperature on the leaching conditions of the precious metals.

In RST 24 the muffle was heated to 482° C. with the doors open, the cold boat and 500 g of dry sample evened to a depth of 2 inches, were introduced for a total time of 45 minutes with continuous rabbling by hand. Temperature was kept close to 482° C.

RST 31 was generally the same as RST 24, however 60 minutes was used.

RST 32 was generally the same as RST 24, however 90 minutes was used.

Table 34 shows the extraction obtained from leaching roasted concentrate at 482° C., with continuous rabbling.

TABLE 34

| | Leaching of Roasted Concentrate | | | | |
|---|---|---|---|---|---|
| | % Extraction | | | | |
| Test No. | Au | Pt | Pd | Cu | Ni |
| RST 24 | 99.3 | 94.2 | 94.2 | 98.4 | 94.9 |
| RST 31 | 99.4 | 96.5 | 95.2 | 98.9 | 96.2 |
| RST 32 | 99.4 | 97.1 | 94.9 | 98.6 | 95.3 |

From the Table above, a period of 60 minutes seems to give the best overall extraction results.

EXAMPLE 16

Two tests were carried out, roasting 500 g concentrate samples at 482° C., with no rabbling, for roasting periods of 60 and 90 minutes.

A concentrate sample was ground in order to obtain a grind of approximately 95%-200 mesh. The ground sample was filtered and split into 500 g charges.

In RST 42 a boat with a 500 g charge (2 inches high) was placed in the muffle pre-heated at 482° C. with open doors, and left to roast for 60 minutes (no rabbling).

Test RST 43 was generally the same as RST 42, however 90 minutes roasting time was used.

Table 35 shows the extraction obtained from leaching roasted concentrate at 482° C. with no rabbling.

TABLE 35

| | % Extraction | | | | |
|---|---|---|---|---|---|
| Test No. | Au | Pt | Pd | Cu | Ni |
| RST 42 | 99.0 | 79.9 | 88.5 | 99.5 | 95.5 |
| RST 43 | 99.0 | 84.2 | 89.0 | 99.3 | 95.4 |

Test RST 43 yielded marginally better leaching extractions for PGM, so that a roasting time of 90 minutes was suggested for the larger sample to leached in the autoclave.

EXAMPLE 17

A concentrate sample weighing 8 kg was ground for 44 minutes at 65% solids in a 10 kg ball mill to yield a grind of approximately 95%-200 mesh. The pulp was filtered and the cake dried.

A sample was placed in the tray, measuring 13⅝ inches×10¾ inches×3 inches (in which the sample fitted evenly) and placed in the muffle of an assay furnace with unforced air circulation, previously heated to 482° C. with doors opened. The charge was left to roast for 90 minutes, after which it was taken out of the muffle and left to cool.

The roasted product was re-pulped in water and placed in the 18.5 liter autoclave. Agitation was started. Concentrated HCl was introduced followed by concentrated $HNO_3$. The vessel was sealed, and steam applied to the heating jacket. Once the prescribed temperature was reached, the vessel was pressurized with oxygen to 50 psig. Temperature and pressure were monitored throughout the test. After the reaction time, the pulp was removed and filtered. The cake residue was washed and dried.

Leaching conditions and results are shown respectively in Tables 36 and 37.

TABLE 36

| Leaching Conditions | |
|---|---|
| Conditions | Test No 28 |
| HCl, (36–38%) (t/t conc.) | 0.945 |
| $HNO_3$ (69%) (t/t conc.) | 0.024 |
| $HCl/HNO_3$ Ratio by Volume | 50:1 |
| Temp., (°C.) | 115 |
| $O_2$ Pressure (psig) | 50 |
| Steam Pressure (psig) | 15 |
| Total Pressure (psig) | 60→100 |
| Reaction Time (hours) | 2 |

TABLE 37

| Leaching Conditions | | | | | | | | | |
|---|---|---|---|---|---|---|---|---|---|
| Test | | Amount | Assay (mg/l, %, g/t) | | | | | | |
| No | Products | g, ml | Au | Pt | Pd | Cu | Ni | Fe | St/S = |
| 28 | Liquor | 6975 | 3.85 | 1.41 | 41.3 | 24100 | 9310 | 61600 | 22800 |
| | Wash | 18320 | 0.83 | 0.30 | 8.16 | 4880 | 1910 | 12500 | 5490 |
| | Residue | 4910.0 | 0.54 | 5.39 | 26.90 | 0.01 | 0.14 | 5.13 | |
| | Head (Cal'd) | 7000.0 | 6.39 | 5.97 | 81.38 | 3.69 | 1.53 | 13.0 | |
| | Head (Direct) | | 6.82 | 6.19 | 81.30 | | | | 5.18/ 6.59 |

| Test | | % Distribution | | | | | |
|---|---|---|---|---|---|---|---|
| No | Products | Au | Pt | Pd | Cu | Ni | Fe |
| 28 | Liquor Wash | 94.1 | 36.6 | 73.8 | 99.7 | 93.6 | 72.3 |
| | Residue | 5.9 | 63.4 | 23.2 | 0.3 | 6.4 | 27.7 |
| | Head (Cal'd) Head | 100.0 | 100.0 | 100.0 | 100.0 | 100.0 | 100.0 |

The roasting stage carried out for this test did not remove enough of the sulfur causing high temperature and pressure during the leaching stage in the autoclave. Even though the slurry was cooled to avoid the temperature at which sulfur melts, it appears that this was not totally avoided to preclude the precipitation of Pt and Pd.

EXAMPLE 18

Activated carbon adsorption of Au was investigated using a solution head assay as set out in Table 38.

TABLE 38

| Solution Head Assay | | | | | |
|---|---|---|---|---|---|
| mg/l | | | g/l | | |
| Au | Pt | Pd | Cu | Ni | Fe |
| 7.33 | 0.97 | 50.6 | 24.1 | 11.8 | 58.2 |

In test 8A, one liter of solution was contacted with 300 g of activated carbon in a beaker. The charge was agitated for 24 hours at room temperature. The total content of Au, Pt and Pd in the solution is approximately 60 mg and 300 g of carbon would give a loading of 200 g/t.

Test 8B was generally the same as test 8A, however 60 g of carbon was used for a loading of 1,000 g/t.

Test 8C was generally the same as test 8A, however 12 g of carbon was used for a loading of approximately 5,000 g/t.

Test 8D was generally the same as test 8A, however 6 g of carbon was used for a loading of 10,000 g/t.

Test 8E used one liter of solution contacted with carbon in a column at the rate of 1 l/hr, for 24 hours at room temperature. The loading was 10,000 g/t.

Test 8F was generally the same as test 8E, however contact period was 72 hours, with samples taken for assay every 24 hours. The results are shown in Table 39.

TABLE 39

| Test No | Desired PGM Loading, g/t | Carbon Conc g/L | Product | Amount g, mL | Assays, mg/L g/t, % | | | | | |
|---|---|---|---|---|---|---|---|---|---|---|
| | | | | | Au | Pt | Pd | Cu | Ni | Fe |
| | | | FEED | 1000 | 7.33 | 0.97 | 50.6 | 24100 | 11800 | 58200 |
| 8A | 200 | 324 | Carbon | 324.0 | 16.6 | 2.22 | 136 | 0.84 | 0.034 | 1.85 |
| | | | Barren Sol'n | 1000 | 0.02 | 0.02 | 0.07 | 18700 | 13000 | 49600 |
| | | | Head(calc) | 1000 | 5.40 | 0.74 | 44.1 | 21422 | 13110 | 55594 |
| 8B | 1000 | 68.2 | Carbon | 68.2 | 80 | 9.1 | 555 | 1.44 | 0.058 | 2.21 |
| | | | Barren Sol'n | 1000 | 0.02 | 0.19 | 5.09 | 22200 | 11300 | 54000 |
| | | | Head(calc) | 1000 | 5.48 | 0.81 | 42.9 | 23182 | 11340 | 55507 |
| 8C | 5000 | 14 | Carbon | 14.0 | 423 | 21.2 | 1553 | 1.39 | 0.075 | 2.80 |
| | | | Barren Sol'n | 1000 | 0.05 | 0.57 | 26.5 | 22600 | 10800 | 53900 |
| | | | Head(calc) | 1000 | 5.97 | 0.87 | 48.2 | 22796 | 10611 | 54292 |
| 8D | 10000 | 7.5 | Carbon | 7.5 | 770 | 23.6 | 2025 | 1.58 | 0.10 | 2.93 |
| | | | Barren Sol'n | 1000 | 0.07 | 0.64 | 31.6 | 22200 | 10400 | 53000 |
| | | | Head(calc) | 1000 | 5.85 | 0.82 | 46.8 | 22317 | 10406 | 53220 |
| 8E Column 24 hour* | 10000 | 7.1 | Carbon | 7.1 | 804 | 25.9 | 2226 | 1.01 | | 2.35 |
| | | | Barren Sol'n | 1000 | 0.05 | 0.68 | 30.1 | 24300 | 12000 | 58600 |
| | | | Head(calc) | 1000 | 5.76 | 0.86 | 45.9 | 24372 | 12000 | 58767 |
| 8F Column 72 hour | 10000 | 7.1 | Carbon | 7.1 | 454 | 26 | 1846 | 2.26 | 0.022 | 1.75 |
| | | | 24 hr Barren | 10 | 0.04 | 0.69 | 28.8 | 24900 | 12200 | 59400 |
| | | | 48 hr Barren | 10 | 0.02 | 0.66 | 26.6 | 25700 | 12700 | 61700 |
| | | | 72 hr Barren | 1000 | 0.02 | 0.62 | 25.3 | 25200 | 12300 | 60500 |
| | | | Head(calc) | 1000 | 3.24 | 0.83 | 39.0 | 25866 | 12551 | 61835 |

| Test No | Desired PGM Loading, g/t | Carbon Conc g/L | Product | % Distribution | | | | | |
|---|---|---|---|---|---|---|---|---|---|
| | | | | Au | Pt | Pd | Cu | Ni | Fe |
| | | | FEED | — | — | — | — | — | — |
| 8A | 200 | 324 | Carbon | 99.6 | 97.3 | 99.8 | 12.7 | 0.8 | 10.8 |
| | | | Barren Sol'n | 0.4 | 2.7 | 0.2 | 87.3 | 99.2 | 89.2 |
| | | | Head(calc) | 100.0 | 100.0 | 100.0 | 100.0 | 100.0 | 100.0 |
| 8B | 1000 | 68.2 | Carbon | 99.6 | 76.6 | 88.1 | 4.2 | 0.3 | 2.7 |
| | | | Barren Sol'n | 0.4 | 23.4 | 11.9 | 95.8 | 99.7 | 97.3 |
| | | | Head(calc) | 100.0 | 100.0 | 100.0 | 100.0 | 100.0 | 100.0 |
| 8C | 5000 | 14 | Carbon | 99.2 | 34.2 | 45.1 | 0.9 | 0.1 | 0.7 |
| | | | Barren Sol'n | 0.8 | 65.8 | 54.9 | 99.1 | 99.9 | 99.3 |
| | | | Head(calc) | 100.0 | 100.0 | 100.0 | 100.0 | 100.0 | 100.0 |
| 8D | 10000 | 7.5 | Carbon | 96.8 | 21.7 | 32.5 | 0.5 | 0.1 | 0.4 |
| | | | Barren Sol'n | 1.2 | 78.3 | 67.5 | 99.5 | 99.9 | 99.6 |
| | | | Head(calc) | 100.0 | 100.0 | 100.0 | 100.0 | 100.0 | 100.0 |
| 8E Column 24 hour* | 10000 | 7.1 | Carbon | 99.1 | 21.3 | 34.4 | 0.3 | 0.0 | 0.3 |
| | | | Barren Sol'n | 0.9 | 78.7 | 65.6 | 99.7 | 100.0 | 99.7 |
| | | | Head(calc) | 100.0 | 100.0 | 100.0 | 100.0 | 100.0 | 100.0 |
| 8F Column 72 hour | 10000 | 7.1 | Carbon | 99.4 | 23.9 | 33.6 | 0.6 | 0.0 | 0.2 |
| | | | 24 hr Barren | 0.0 | 0.8 | 0.7 | 1.0 | 1.0 | 1.0 |
| | | | 48 hr Barren | 0.0 | 0.8 | 0.7 | 1.0 | 1.0 | 1.0 |
| | | | 72 hr Barren | 0.6 | 74.5 | 64.9 | 97.4 | 98.0 | 97.8 |

TABLE 39-continued

| | | | | | | |
|---|---|---|---|---|---|---|
| Head(calc) | 100.0 | 100.0 | 100.0 | 100.0 | 100.0 | 100.0 |

*Au and Pt analyses reported as 0.02 mg/L should read <0.02 mg/L.

There was excellent adsorption of Au, Pt and Pd with the loading rate of 200 g/t.

The adsorption of Au was excellent at all loading rates.

As the loading rate increased, the adsorption of Pt and Pd decreased.

The change in method of contact of solution and carbon did not alter the results and neither did the lengthening of contact time.

It seems the adsorption of Pt and Pd is slower than that of gold, and that the high oxidation potential of the solution interferes with their adsorption, by oxidizing the reductive sites of the activated carbon. This raises the possibility of enhancing the adsorption of Pt and Pd by lowering the oxidation potential of the solution.

EXAMPLE 19

The acid solutions obtained by pressure leach have a high oxidation potential. Solutions which have extracted most of the precious metals contained in their feed material, in general have an EMF reading higher than 800 mV. Further, they contain an excess of acid.

The aim of the following test was to neutralize the excess acid and lower the oxidation potential, by contacting the solution with fresh concentrate. The neutralized solution, with lower oxidation potential, would then be contacted with activated carbon. Table 40 sets out the head assay of the solution.

TABLE 40

| Head Assay of Solution | | | | |
|---|---|---|---|---|
| mg/l | | | g/l | |
| Au | Pt | Pd | Cu | Ni |
| 5.91 | 0.89 | 48.50 | 23.5 | 11.4 |

The purpose of the test was to contact the leach solution with fresh feed, to lower the oxidation potential of the solution and to improve the loading of precious metals into activated carbon.

The sample used was one liter of solution containing 400 g of flotation concentrate feed.

Fresh feed was contacted with leach solution, 100 g at a time at 15–20 minute intervals. EMF and pH readings were monitored throughout the test. The test was carried out at 80° C. for 3½ hours. After a pre-set oxidation potential (EMF approximately 400 mV) was reached, the slurry was filtered and the solution contacted with activated carbon. The results are shown in Table 41.

TABLE 41

| Neutralization and Au-PGM Recovery by Activated Carbon | | | | | | | |
|---|---|---|---|---|---|---|---|
| | Wt:Vol | | Assay mg/l; g/l:o/o:g/t | | | | |
| | g, ml | EMF | Au | Pt | Pd | Cu | Ni |
| Feed Solution | 1000 | 785 | 5.91 | 0.89 | 48.5 | 23.5 | 11.4 |
| Final Solution | 1000 | 535 | 0.08 | 0.07 | 0.62 | 34.1 | 25.0 |
| Feed Concentrate | 823 | | 19.10 | 13.80 | 168.0 | 7.02 | 5.45 |
| Final Residue | 709.3 | | 29.40 | 16.50 | 252.0 | 6.64 | 4.53 |

It can be seen from Table 41 that lowering the oxidation potential resulted in the precipitation of the precious metals. These results make a very good case for the use of cementation of the precious metals using copper to this effect.

EXAMPLE 20

Two tests were carried out to obtain a Au-Pt-Pd cement product. In test A, 400 ml of solution were heated to 80° C. Copper shot was added stage-wise until an EMF reading in the neighbourhood of 300 mV was obtained. slurry was then filtered.

The EMF reading was decreased from 806 mV to 381 mV using 25 g of copper shot.

Extraction results were: 84.9% for Au; 81.2% for Pt; and 44% for Pd.

Test B was generally the same as test A, but Cu powder was used instead of shot, and a reading for EMF of 250 mV was proposed.

Solution analysis is shown in Table 42.

TABLE 42

| | Cementation Test | | | | | |
|---|---|---|---|---|---|---|
| | Au | Pt | Pd | Cu | Ni | Fe |
| Feed Solution 19 A/C liquor | 3.61 | 3.94 | 38.0 | 19900 | 14700 | 54100 |
| Final Solution | 0.08/ 0.08 | 0.29/ 0.29 | 13.40 13.30 | 82900 | 15400 | 56200 |
| % Extracted | 97.8 | 92.4 | 65.7 | — | — | — |

Reasonable extractions were obtained for Au and Pt, however less reasonable results were obtained for Pd.

EXAMPLE 21

Four tests were performed to study the possibility that if contact with carbon happened at the same time as neutralization, because of greater affinity of the carbon toward precious metals, these may report in the carbon preferentially, rather than in the neutralizing material.

In test number 33, 200 g of calcine were contacted with 0.5 liters of solution (40% solids) 150 g of activated carbon being added, and the slurry being mixed for eight hours at 80° C. The pH and EMF were monitored At the end of the test, the slurry was filtered and the carbon screened out and washed. Test number 34 was generally the same as test number 33, but samples were removed every two hours for analysis. Test number 35 was generally the same as test number 33, however calcine was added by 50 g increments every hour, over a four hour period.

Test number 36 was generally the same as test number 35, however intermediate solution samples were removed for analysis every two hours with the aim of investigating the kinetics of neutralization and carbon adsorption processes.

The extent to which the precious metals reported into the activated carbon is shown in Table 43.

TABLE 43

| Recovery of Au-PGM in Carbon at Neutralization Stage | | | | |
|---|---|---|---|---|
| | | % Distribution | | |
| Test No | Product | Au | Pt | Pd |
| 33 | Carbon | 80.6 | 36.4 | 58.6 |
| 34 | Carbon | 75.2 | 35.9 | 56.8 |

TABLE 43-continued

Recovery of Au-PGM in Carbon at Neutralization Stage

| Test No | Product | % Distribution | | |
|---|---|---|---|---|
| | | Au | Pt | Pd |
| 35 | Carbon | 75.9 | 35.6 | 58.1 |
| 36 | Carbon | 73.9 | 39.0 | 58.4 |

EXAMPLE 22

A test series was designed to extract Au-PGM by a combination of cementation of Au-PGM with Cu down to a prescribed reading for EMF, and then contacting the solution with activated carbon.

Autoclave leach solution was contacted with Cu powder. Cu powder was added to specific solution EMF of 500, 450 and 400 mV. The cement was removed by filtration (0.45 micron paper) and the solution was contacted with the carbon (300 g/l in test numbers 38, 39, 40, and 15 g/l in test number 41).

Au-PGM extractions are shown in Table 44.

TABLE 44

| Test No | Final EMF, mv | Cu Added g/L | Product | Amount | Au, mg/L | Pt, mg/L | Pd, mg/L | Cu, g/L | Ni, g/L | Fe, g/L |
|---|---|---|---|---|---|---|---|---|---|---|
| | | | Feed | | 4.11 | 4.71 | 44.40 | 19.00 | 14.10 | 52.2 |
| 38 | 500 | 10 | Cement'n Sol'n | 400 mg/L | 1.28 | 4.71 | 46.10 | 29.70 | 15.00 | 54.4 |
| | | | Loaded Carbon | 125.5 g | 0.91 | 8.30 | 69.40 | | | |
| | | | Barren Sol'n | 278 mL | 0.39 | 1.27 | 11.50 | 20.00 | 14.70 | 42.1 |
| | | | % Extr'n By Cem'n | | 68.9 | 0.0 | 0.0 | 1.15 | 0.044 | 0.31 |
| | | | % Extr'n By Adsorp | | 90.5 | 73.0 | 74.1 | | | |
| 41 | 500 | 9.5 | Cement'n Sol'n | 400 mg/L | 0.70 | 4.70 | 45.60 | 28.40 | 14.30 | 52.6 |
| | | | Loaded Carbon | 6.1 g | 26.60 | 67.20 | 375 | 0.65 | 0.050 | 1.10 |
| | | | Barren Sol'n | 375 mL | 0.24 | 3.68 | 38.70 | 28.30 | 14.50 | 52.6 |
| | | | % Extr'n By Cem'n | | 83.0 | 0.0 | 0.0 | | | |
| | | | % Extr'n By Adsorp | | 94.2 | 21.9 | 12.8 | | | |
| 39 | 450 | 33 | Cement'n Sol'n | 400 mg/L | 0.23 | 1.31 | 82.90 | 52.60 | 14.70 | 53.9 |
| | | | Loaded Carbon | 124.3 g | 2.97 | 10.80 | 99.1 | 0.68 | 0.085 | 1.03 |
| | | | Barren Sol'n | 275 mL | 0.04 | 0.12 | 7.77 | 32.70 | 14.90 | 48.0 |
| | | | % Extr'n By Cem'n | | 94.4 | 72.2 | 25.9 | | | |
| | | | % Extr'n By Adsorp | | 99.0 | 97.5 | 82.5 | | | |
| 40 | 400 | 65 | Cement'n Sol'n | 400 mg/L | 0.08 | 1.01 | 25.10 | 81.90 | 14.20 | 51.9 |
| | | | Loaded Carbon | 142.5 g | 0.39 | 2.13 | 45.4 | 3.82 | 0.093 | 0.57 |
| | | | Barren Sol'n | 290 mL | 0.06 | 0.11 | 7.82 | 44.80 | 14.30 | 50.8 |
| | | | % Extr'n By Cem'n | | 98.1 | 78.6 | 43.5 | | | |
| | | | % Extr'n By Adsorp | | 98.5 | 97.7 | 82.8 | | | |

The results indicate that with 33 g/l Cu addition to EMF 450 mV and with 300 g/l carbon, 99% of Au, 97% of Pt and 82% of Pd can be extracted.

Lower carbon concentration (15 g/l) was not efficient; only 21% Pt and 13% Pd were extracted (at initial solution EMF=500 mV).

The above description should be interpreted in an illustrative rather than a restrictive sense as modifications to the above description may be apparent to those skilled in the relevant art without departing from the spirit and scope of the present invention as defined by the claims set out below.

For example, although the sulfur content of the test samples is inherent in the ore, it would no doubt be possible to add sulfur to ores of lower sulfur content or mix higher sulfur content ores with lower sulfur content ores.

We claim:

1. A process for recovering platinum group metals from an ore concentrate containing at least platinum group metals and sulfur comprising
   roasting said concentrate in an oxygen-containing environment at a temperature sufficient to oxidize a portion of said sulfur to form a roasted concentrate, said roasting being carried out until the sulfur content in said concentrate is reduced to approximately 2%:
   mixing said roasted concentrate with a solution of hydrochloric acid and nitric acid, said nitric acid being present in said solution in an amount sufficient to enhance dissolution of metals from said roasted concentrate; and
   heating said mixture of said roasted concentrate and said solution of hydrochloric acid and nitric acid to a temperature sufficient to allow a substantial portion of said metals to dissolve in said hydrochloric and nitric acid solution with said solution being in an environment containing oxygen at a pressure sufficient to regenerate at least a portion of said nitric acid.

2. A process for recovering platinum group metals from an ore concentrate containing at least platinum group metals and sulfur, said process comprising the steps of:
   1) roasting said concentrate in the presence of oxygen at a temperature of from 900° F. to 1200° F. until the content of said sulfur is reduced to approximately 2% and thereby forming a roasted concentrate;
   2) mixing said roasted concentrate with hydrochloric and nitric acids in a proportion of from 100 to 3 parts hydrochloric acid per part of nitric acid;
   3) heating said mixture of roasted concentrate and hydrochloric and nitric acids to a temperature from about 100° F. to 288° F.;
   4) maintaining said heated acid and roasted concentrate mixture in an oxygen environment having an oxygen gas pressure sufficient to regenerate at least some of said nitric acid for a period of time sufficient to allow substantial dissolution of said metals in said roasted concentrate to form a solution of said metals and said acids;
   5) separating said metals from said solution.

3. A process as claimed in claim 2 wherein: said oxygen environment in step 1 is air; said concentrate is rabbled during said roasting to promote said oxidation of sulfur; and said oxygen pressure in step 4 is from 50 to 100 p.s.i.g.

4. A process as claimed in claim 3 wherein: said ore contains gold, platinum, palladium, copper, nickel, iron and sulfur.

5. A process as claimed in claim 4 wherein: said gold is separated from said solution by collection in activated carbon;
said palladium is separated from said solution by mixture of said solution with dioctyl or dihexyl sulfide;
said platinum is removed from said solution by cementation with a copper powder; and
said nickel and said iron are precipitated as hydroxides.

6. A process as claimed in claim 4 wherein:
said gold is separated from said solution by collection in activated carbon;
said palladium is partially separated from said solution by collection in activated carbon and the remainder of said palladium is separated from said solution by mixture of said solution with a suitable solvent extraction agent;
a portion of said platinum is partially separated from said solution by collection in activated carbon and the remainder of said platinum is separated from said solution by cementation with copper powder;
said copper is removed from said solution by electrolysis;
a part of said iron is oxidized to form a ferric oxide precipitate which is separated from said solution;
the balance of said iron is precipitated as a ferric hydroxide; and
said nickel is removed by precipitation with calcium carbonate to form a nickel carbonate precipitate and calcium chloride; and, said calcium chloride solution is reacted with sulfuric add to give hydrochloric acid and calcium sulfate, said hydrochloric add being used in step 2.

7. A process as claimed in claim 4 wherein:
said gold is separated from said solution by collection in activated carbon;
said palladium is partially separated from said solution by collection in activated carbon and the remainder of said palladium is separated from said solution by mixture of said solution with a suitable solvent extraction agent;
a portion of said platinum is partially separated from said solution by collection in activated carbon and the remainder of said platinum is separated from said solution by electrolysis together with said copper;
said copper is removed from said solution by electrolysis;
a part of said iron is oxidized to form a ferric oxide precipitate which is separated from said solution;
the balance of said iron is precipitated as a ferric hydroxide; and
said nickel is removed by precipitation with calcium carbonate to form a nickel carbonate precipitate and calcium chloride; and,
said calcium chloride solution is reacted with sulfuric acid to give hydrochloric acid and calcium sulfate, said hydrochloric acid being used in step 2.

8. A process as claimed in claim 6, wherein said suitable solvent extraction agent is selected from the group comprising dioctyl and dihexyl sulfide.

9. A process as claimed in claim 7, wherein said suitable solvent extraction agent is selected from the group comprising dioctyl and dihexyl sulfide.

10. A process as claimed in claim 4 wherein:
said gold is separated from said solution by collection in activated carbon;
said palladium is partially separated from said solution by collection in activated carbon and the remainder of said palladium is separated from said solution by mixture of said solution with a suitable solvent extraction agent;
a portion of said platinum is partially separated from said solution by collection in activated carbon and the remainder of said platinum is separated from said solution by cementation with copper powder;
said copper is removed from said solution by electrolysis;
a part of said iron is oxidized to form a ferric oxide; and,
said nickel is removed through electrolysis as nickel plate.

11. A process as claimed in claim 4 wherein:
said gold is separated from said solution by collection in activated carbon;
a portion of said palladium is separated from said solution by collection in activated carbon and the remainder of said palladium is separated from said solution by a mixture of said solution with a suitable solvent extraction agent;
a portion of said platinum is separated from said solution by collection in activated carbon and the remainder of said platinum is separated from said solution by cementation with copper powder;
said copper is removed from said solution by electrolysis;
a part of said iron is oxidized to form a ferric oxide; and,
said nickel is removed as a hydroxide.

12. A process as claimed in claim 10, wherein said suitable solvent extraction agent is selected from the group comprising dioctyl and dihexyl sulfide.

13. A process as claimed in claim 11, wherein said suitable solvent extraction agent is selected from the group comprising dioctyl and dihexyl sulfide.

14. A process for recovering platinum group metals from an ore concentrate containing at least platinum group metals and sulfur, said process comprising the steps of:
1) roasting said concentrate in air at a temperature of from 900° F. to 1200° F. until the sulfur content is reduced to about 2% by weight and thereby forming a roasted concentrate;
2) mixing said roasted concentrate in a glass-lined autoclave with hydrochloric and nitric acids in a ratio of about 50:1 of hydrochloric:nitric acid;
3) sealing said autoclave, heating said mixture of roasted concentrate and hydrochloric and nitric adds to a temperature of about 190° F. and introducing oxygen to maintain an oxygen pressure of about 50 p.s.i.g. and continuing said heating until at least 90% of said platinum has dissolved;
4) separating said dissolved platinum from solution.

* * * * *

UNITED STATES PATENT AND TRADEMARK OFFICE
CERTIFICATE OF CORRECTION

Patent No.: 5,364,444                      Page 1 of 4

Dated: November 15, 1994

Inventor(s): C. Dale McDoulett, Jr. and George W. Reschke

It is certified that error appears in the above-identified patent and that said Letters Patent is hereby corrected as shown below:

Column 1, line 28, insert --a-- before "series";

Column 2, TABLE 1, row 2 (indicating the % Beryllium), delete "<0.001" and substitute --<0.0001-- therefor;

Columns 5 and 6, TABLE 4 - continued, row 9 of the test results (under the column heading of "Pd"), delete "292" and substitute --181-- therefor;

Columns 5 and 6, TABLE 4 - continued, row 16 of the test results (under the column heading of "Pd"), delete "292" and substitute --181-- therefor;

Column 6, TABLE 5, row 3 of the test results (indicating reaction time, hours for Test 5), delete "1" and substitute --7-- therefor;

Columns 5 and 6, TABLE 6, row 13 of the test results, delete "23.0" (% Distribution of Cu) and substitute --23.9-- therefor and delete "19.3" (% Distribution of Ni) and substitute --19.2-- therefor;

Column 8, TABLE 7, insert the subheading --Oxidant Boosted HCl Pressure Leaching-- after "TABLE 7";

UNITED STATES PATENT AND TRADEMARK OFFICE
CERTIFICATE OF CORRECTION

Patent No.:    5,364,444                              Page 2 of 4

Dated:         November 15, 1994

Inventor(s):   C. Dale McDoulett, Jr. and George W. Reschke

It is certified that error appears in the above-identified patent and that said Letters Patent is hereby corrected as shown below:

Columns 7 and 8, TABLE 8, insert the subheading --Oxidation Boosted HCl Pressure Leaching of High Grade Concentrate-- after "TABLE 8";

Columns 7 and 8, TABLE 8, row 3 of the test results, delete "95.8" (% Distribution of Cu) and substitute --98.5-- therefor and delete "98.5" (% Distribution of Ni) and substitute --95.8-- therefor;

Columns 7 and 8, TABLE 8, row 10 of the test results, delete "96.7" (% Distribution of Au) and substitute --98.7-- therefor;

Columns 9 and 10, TABLE 8 - continued, row 1 of the test results, delete "0.3" (% Distribution of Cu) and substitute --0.2-- therefor;

Columns 9 and 10, TABLE 8 - continued, move the % Distribution amounts for Test No. 10 from "Head (Direct)" to "Head (Calc'd)";

Columns 9 and 10, TABLE 10, add the numeral "12" under the column "Test No." on row 8;

Column 11, TABLE 11, row 7 of the test results (the Pulp Density of Test No. 14), delete "4" and substitute --44-- therefor;

UNITED STATES PATENT AND TRADEMARK OFFICE
CERTIFICATE OF CORRECTION

Patent No.: 5,364,444　　　　　　　　Page 3 of 4

Dated: November 15, 1994

Inventor(s): C. Dale McDoulett, Jr. and George W. Reschke

It is certified that error appears in the above-identified patent and that said Letters Patent is hereby corrected as shown below:

Column 11, TABLE 11, row 13 of the test results, before "(psig)", delete "(at temp)";

Column 12, line 51, insert --of-- between "use" and "air";

Columns 17 and 18, TABLE 19, row 6 of the test results (Muffle dimensions, inches), delete "0½" (three occurrences) and substitute --9½-- therefor in each instance;

Column 20, line 65, delete "dear" and substitute --clear-- therefor;

Column 28, line 3, insert --be-- between "to" and "leached";

Column 32, line 17, insert --The-- before "slurry";

Columns 33 and 34, TABLE 44, in Test No. 39, for the Product "Cement'n Sol'n" under the Assay "Pd,mg/L", delete "82.90" and substitute --32.90-- therefor;

UNITED STATES PATENT AND TRADEMARK OFFICE
CERTIFICATE OF CORRECTION

Patent No.: 5,364,444

Dated: November 15, 1994

Inventor(s): C. Dale McDoulett, Jr. and George W. Reschke

It is certified that error appears in the above-identified patent and that said Letters Patent is hereby corrected as shown below:

Column 35, line 37, delete "add" and substitute --acid-- therefor;

Column 35, line 39, delete "add" and substitute --acid-- therefor; and

Column 36, line 61, delete "adds" and substitute --acids-- therefor.

Signed and Sealed this

Sixth Day of June, 1995

Attest:

BRUCE LEHMAN

Attesting Officer

Commissioner of Patents and Trademarks